United States Patent
Kobayashi

(10) Patent No.: US 11,245,796 B2
(45) Date of Patent: Feb. 8, 2022

(54) MIXED-COLOR CHARACTERISTIC CORRECTING IMAGE PROCESSING APPARATUS, AND MIXED-COLOR CHARACTERISTIC CORRECTION METHOD

(71) Applicant: Ryo Kobayashi, Kanagawa (JP)

(72) Inventor: Ryo Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/839,233

(22) Filed: Apr. 3, 2020

(65) Prior Publication Data

US 2020/0336603 A1     Oct. 22, 2020

(30) Foreign Application Priority Data

Apr. 22, 2019  (JP) .............................. JP2019-081152

(51) Int. Cl.
*H04N 1/60*     (2006.01)
*H04N 1/00*     (2006.01)

(52) U.S. Cl.
CPC ....... *H04N 1/00023* (2013.01); *H04N 1/6002* (2013.01)

(58) Field of Classification Search
CPC ..................... H04N 1/00023; H04N 1/6002
See application file for complete search history.

(56) References Cited

U.S. PATENT DOCUMENTS

| | | | | |
|---|---|---|---|---|
| 8,625,166 B2* | 1/2014 | Yabe | ........................ | H04N 1/52 358/3.26 |
| 2003/0156853 A1* | 8/2003 | Fukutani | ............. | G03G 15/2064 399/68 |
| 2004/0234281 A1* | 11/2004 | Yoshida | ............... | G03G 15/553 399/24 |
| 2006/0227202 A1* | 10/2006 | Suzuki | ............... | G03G 15/0131 347/132 |
| 2008/0278739 A1* | 11/2008 | Kudo | .................. | G03G 15/5004 358/1.14 |
| 2013/0135422 A1 | 5/2013 | Kobayashi | | |
| 2013/0164002 A1* | 6/2013 | Tanaka | ............... | G03G 15/5087 399/30 |
| 2014/0016149 A1* | 1/2014 | Matsuzaki | ......... | H04N 1/00005 358/1.9 |
| 2014/0104658 A1* | 4/2014 | Ishizuka | ............... | H04N 1/6044 358/3.24 |
| 2014/0211263 A1 | 7/2014 | Kobayashi | | |
| 2015/0077780 A1* | 3/2015 | Harashima | ........... | G06K 15/408 358/1.13 |
| 2015/0227101 A1* | 8/2015 | Uchida | ................ | G03G 15/553 399/24 |
| 2015/0253704 A1* | 9/2015 | Hirose | ................ | G03G 15/2039 399/33 |
| 2016/0044207 A1 | 2/2016 | Kobayashi | | |

(Continued)

FOREIGN PATENT DOCUMENTS

JP      10-198222       7/1998
JP      2006-243574     9/2006

(Continued)

*Primary Examiner* — Dung D Tran
(74) *Attorney, Agent, or Firm* — IPUSA, PLLC

(57) ABSTRACT

An image processing apparatus includes circuitry configured to provide information in response to satisfaction of a given condition. The information indicates that a mixed-color characteristic is to be corrected.

19 Claims, 20 Drawing Sheets

(56) References Cited

U.S. PATENT DOCUMENTS

2016/0109821 A1\* 4/2016 Oka .................. G03G 15/5058
                                                    399/40
2018/0198958 A1   7/2018 Yoshida

FOREIGN PATENT DOCUMENTS

| JP | 2013-187581 | 9/2013 |
| JP | 2018-113575 | 7/2018 |

\* cited by examiner

THE NUMBER OF RECORDING MEDIA ON WHICH TONER IMAGES ARE TRANSFERRED FROM INTERMEDIATE TRANSFER BELT HAS EXCEEDED A GIVEN VALUE. MIXED-COLOR CHARACTERISTIC HAS POSSIBLY CHANGED. PLEASE CORRECT MIXED-COLOR CHARACTERISTIC.

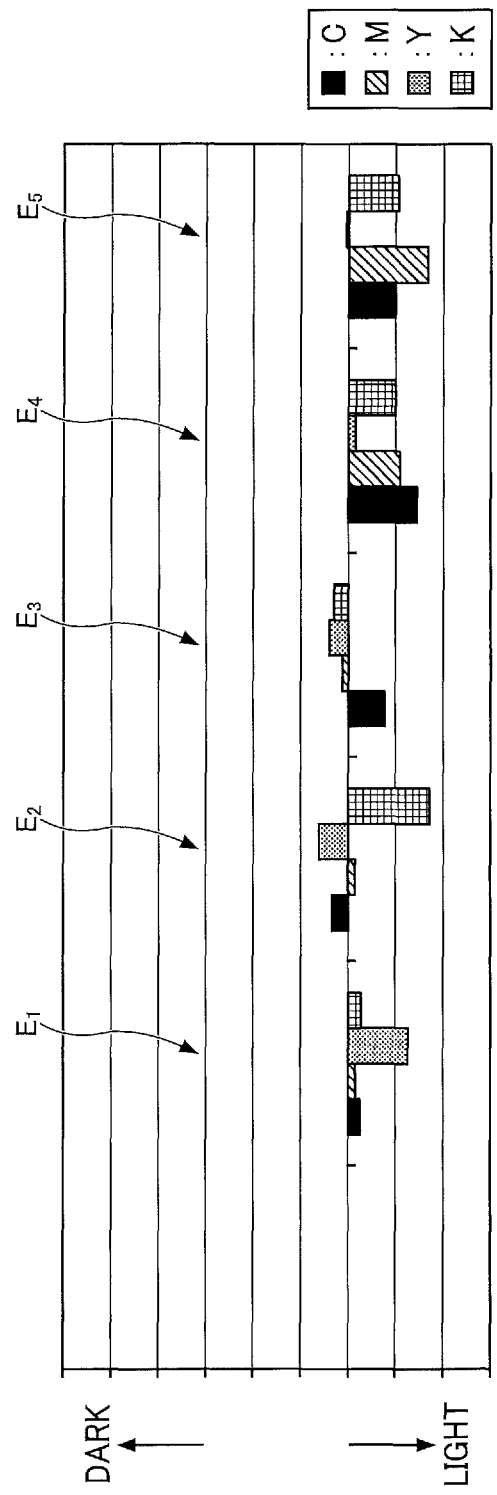

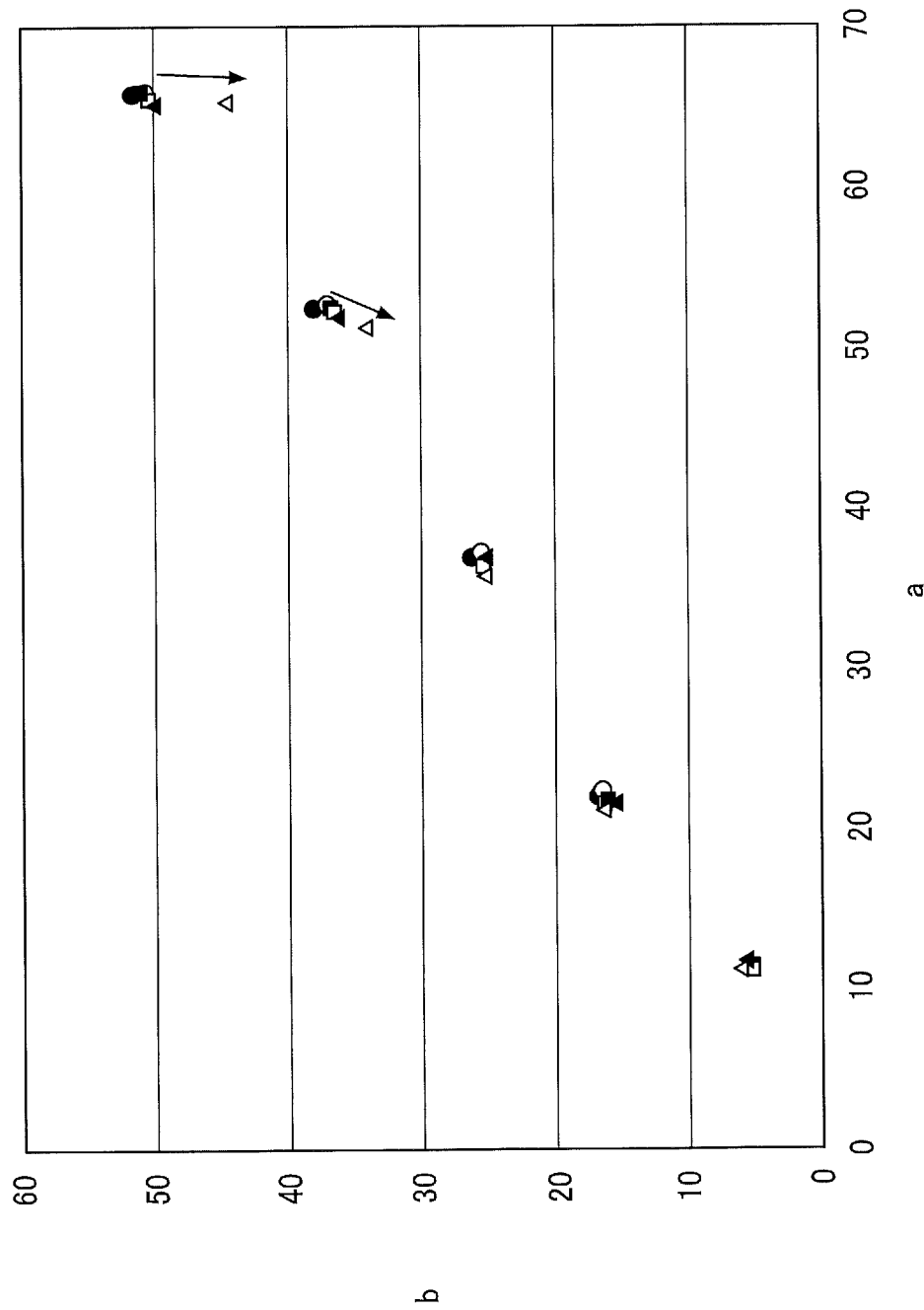

MIXED-COLOR CHARACTERISTIC CORRECTING IMAGE PROCESSING APPARATUS, AND MIXED-COLOR CHARACTERISTIC CORRECTION METHOD

CROSS-REFERENCE TO RELATED APPLICATION

This patent application is based on and claims priority pursuant to 35 U.S.C. § 119(a) to Japanese Patent Application No. 2019-081152, filed on Apr. 22, 2019, in the Japan Patent Office, the entire disclosure of which is hereby incorporated by reference herein.

BACKGROUND

Technical Field

Embodiments of the present disclosure relate to an image processing apparatus, an image processing method, and a non-transitory computer-readable storage medium storing program code that causes a computer to perform the image processing method.

Related Art

Image processing apparatuses such as image forming apparatuses typically correct a mixed-color characteristic. Specifically, the image processing apparatuses correct temporal changes in characteristic of mixed colors such as gray and secondary colors generated by mixing primary colors of cyan, magenta, yellow, and black. Such image processing apparatus often determine whether the mixed-color characteristic is to be corrected, based on measurement by, e.g., a user of the mixed-color characteristic using mixed-color patches less in number compared to a case in which characteristics of single colors such as cyan, magenta, yellow, and black are corrected and then characteristics of mixed colors are corrected.

SUMMARY

In one embodiment of the present disclosure, a novel image processing apparatus includes circuitry configured to provide information in response to satisfaction of a given condition. The information indicates that a mixed-color characteristic is to be corrected.

Also described are novel image processing method and non-transitory, computer-readable storage medium storing computer-readable program code that causes a computer to perform the image processing method.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 14 is a graph illustrating an experimental result of a single-color tone shift due to changes in secondary transfer current;

FIG. 15 is a graph illustrating an experimental result of a mixed-color hue shift due to changes in secondary transfer current;

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
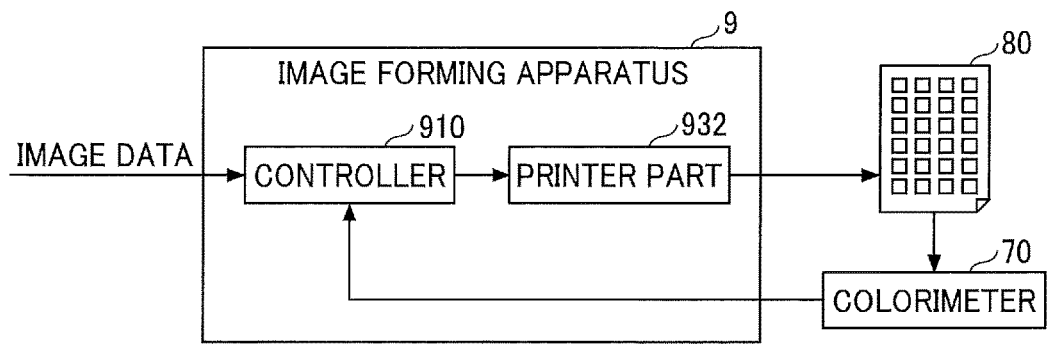
FIG. 1 is a block diagram illustrating a configuration of an image forming apparatus according to an embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

As used herein, the singular forms "a," "an," and "the" are intended to include the plural forms as well, unless the context clearly indicates otherwise.

It is to be noted that, in the following description, suffixes Y, M, C, and K denote colors of yellow, magenta, cyan, and black, respectively. To simplify the description, these suffixes are omitted unless necessary.

Referring to the drawings, wherein like reference numerals designate identical or corresponding parts throughout the several views, embodiments of the present disclosure are described below.

In the embodiments below, an image forming apparatus is described as an example of an image processing apparatus. The image forming apparatus is herein described as a multifunction peripheral, product, or printer (MFP). The image forming apparatus is an output device employing an electrophotographic system or an inkjet system for printing out image data on a recording medium such as a sheet of paper. The image forming apparatus executes an image forming process as a copier, a scanner, a printer, and the like.

Initially with reference to FIG. 1, a description is given of a configuration of an image forming apparatus according to an embodiment of the present disclosure.

FIG. 1 is a block diagram illustrating an example of the configuration of an image forming apparatus 9.

As illustrated in FIG. 1, the image forming apparatus 9 includes a controller 910 and a printer part 932.

In response to a printout instruction from application software running on a host computer such as a personal computer (PC), the host computer activates a printer driver and transmits image data to be printed to the controller 910 of the image forming apparatus 9. After executing various kinds of image processing on the image data, the controller 910 converts the image data thus processed into printer output data. The controller 910 then outputs the printer output data to the printer part 932. The printer part 932 forms an image on a recording medium, such as a sheet of paper, according to the printer output data.

In addition, the image forming apparatus 9 has a function of correcting color characteristics of the image formed on the recording medium to attain color stability. When instructed to correct the color characteristics by the host computer, the image forming apparatus 9 corrects a single-color characteristic or a mixed-color characteristic.

In the correction of the single-color characteristic, the image forming apparatus 9 prints out a single-color reference chart 90 including color patches in single colors (i.e., primary colors) of yellow (Y), magenta (M), cyan (C), and black (K). A colorimeter 70 measures the color patches included in the single-color reference chart 90. The image forming apparatus 9 corrects a gamma curve based on measurement data output by the colorimeter 70 such that a given tone of each color matches a desired color. Note that the colorimeter 70 may be a scanner or the like provided that the colorimeter 70 can acquire color characteristics.

On the other hand, in the correction of the mixed-color characteristic, the image forming apparatus 9 prints out a mixed-color reference chart 80 including mixed-color patches, instead of single-color patches. Note that the mixed-color patches are patches of mixed colors that are generated by superimposing different single colors one atop another. The colorimeter 70 measures the mixed-color patches included in the mixed-color reference chart 80. The image forming apparatus 9 corrects an output profile based on measurement data output by the colorimeter 70 such that a color generated by superimposing different single colors having given gradation values one atop another matches a desired color.

In a case in which the gamma curve is corrected based on the color measurement of single-color patches, mixed-color reproduction may not match. However, by correcting the mixed-color characteristic, the mixed colors can be reproduced as appropriate.

Figure 2:
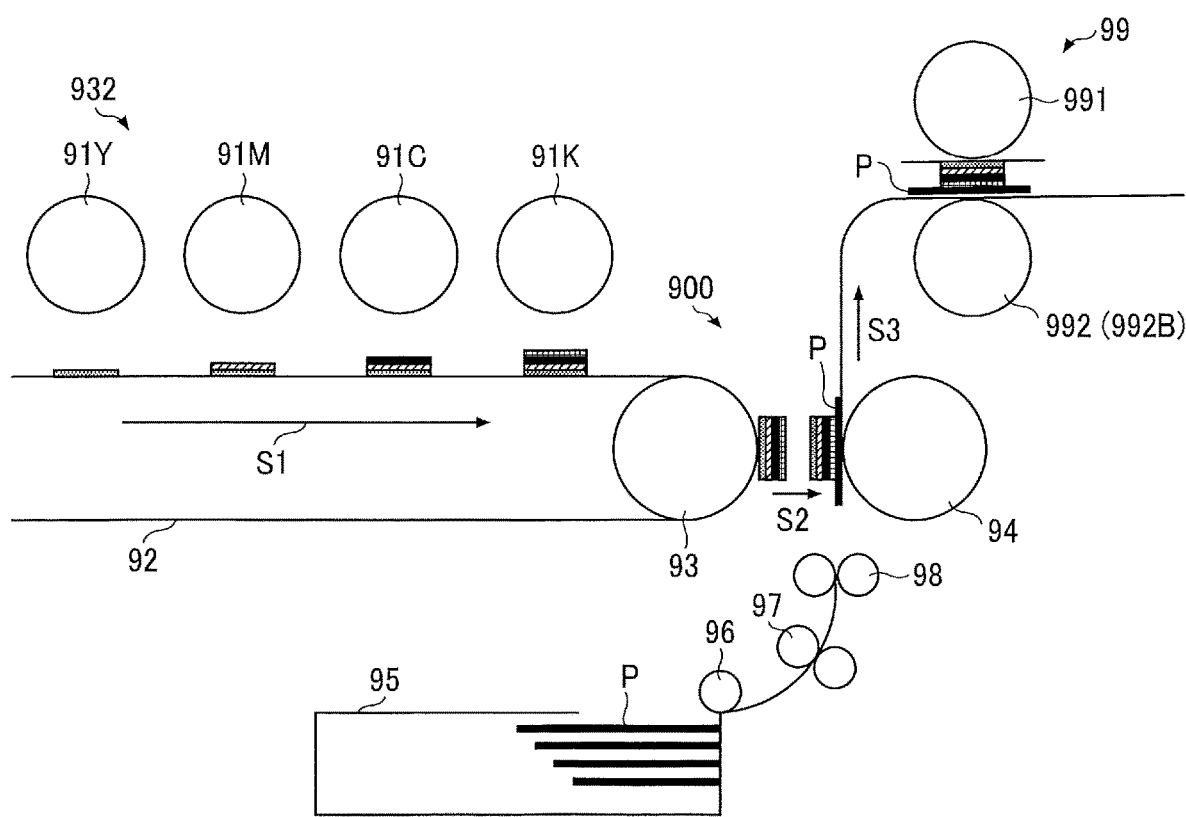
FIG. 2 is a diagram illustrating a configuration of a printer part of the image forming apparatus.

Referring now to FIG. 2, a description is given of a configuration of the printer part 932 of the image forming apparatus 9 described above.

FIG. 2 is a diagram illustrating an example of the configuration of the printer part 932 of the image forming apparatus 9.

As illustrated in FIG. 2, the printer part 932 of the image forming apparatus 9 includes four image forming devices. The four image forming devices include, e.g., drum-shaped photoconductors 91Y, 91M, 91C, and 91K, to form images of yellow, magenta, cyan, and black, respectively. Hereinafter, the photoconductors 91Y, 91M, 91C, and 91K may be collectively referred to as photoconductors 91.

The four photoconductors 91 are spaced apart at equal intervals in a rotation direction S1 of an intermediate transfer belt 92 inside the image forming apparatus 9, thus being arranged side by side. As a driver such as a motor transmits a driving force to each of the photoconductors 91, a circumferential surface of each of the photoconductors 91 rotates in the same direction as the rotation direction S1 of the intermediate transfer belt 92 that is disposed opposite the photoconductors 91. The intermediate transfer belt 92 herein serves as an intermediate transferor.

The surface of each of the photoconductors 91 is uniformly charged in a charging process. Thereafter, an optical writing unit emits a laser beam according to image data to form an electrostatic latent image on each of the photoconductors 91 in an exposure process. A developing device, which is included in each of the four image forming devices, develops the electrostatic latent image thus formed on each of the photoconductors 91 into a visible toner image in a developing process. Thus, the toner image is formed on each of the photoconductors 91.

The intermediate transfer belt 92 disposed opposite the four photoconductors 91 is entrained around a transfer driving roller 93 and a driven roller such that opposed lateral portions of the intermediate transfer belt 92 face the transfer driving roller 93 and the driven roller, respectively.

As a driver drives and rotates the transfer driving roller 93, the intermediate transfer belt 92 rotates in the rotation direction S1. During the rotation of the intermediate transfer belt 92, the surface of each of the photoconductors 91 contacts an outer circumferential surface of the intermediate transfer belt 92. In a loop formed by the intermediate transfer belt 92, four primary transfer rollers are disposed opposite the respective photoconductors 91 via the intermediate transfer belt 92. The four primary transfer rollers supplied with biases primarily transfer the toner images from the respective photoconductors 91 onto the intermediate transfer belt 92 such that the toner images are superimposed one atop another on the intermediate transfer belt 92. In other words, yellow, magenta, cyan, and black toner images are superimposed one atop another on the intermediate transfer belt 92, thus being primarily transferred onto the intermediate transfer belt 92. Thus, a color toner image constructed of the yellow, magenta, cyan, and black toner images is formed on the intermediate transfer belt 92.

A secondary transfer roller 94 is disposed at a position outside the loop formed by the intermediate transfer belt 92 and opposite the transfer driving roller 93 via the intermediate transfer belt 92. The secondary transfer roller 94 contacts the intermediate transfer belt 92 at the position opposite the transfer driving roller 93, thereby forming an area of contact, herein referred to as a secondary transfer nip, between the secondary transfer roller 94 and the intermediate transfer belt 92. A transfer device 900 includes the intermediate transfer belt 92, the transfer driving roller 93, and the secondary transfer roller 94.

An input tray 95 stores a plurality of recording media P, which lie stacked in an internal space of the input tray 95. A sheet feeding roller 96 is disposed on a right end side of the input tray 95 in FIG. 2. The sheet feeding roller 96 contacts an uppermost recording medium P of the plurality of recording media P lying stacked on the input tray 95 to pick up and feed out the uppermost recording medium P. The input tray 95 herein serves as a container.

Since the sheet feeding roller 96 simply conveys the plurality of recording media P one by one in a given direction, another component other than a roller may be used instead of the sheet feeding roller 96. For example, instead of the sheet feeding roller 96, an endless belt entrained around two rollers may be used. In such a case, the endless belt rotates to pick up and feed out the plurality of recording media P one by one.

In the example illustrated in FIG. 2, as the sheet feeding roller 96 is rotated, the sheet feeding roller 96 picks up and feeds out the uppermost recording medium P. The recording medium P is then conveyed toward between rollers of a registration roller pair 98 via a conveyance roller pair 97.

The recording medium P thus conveyed to the registration roller pair 98 temporarily stops at an area of contact, herein referred as a roller nip, between the rollers of the registration roller pair 98 that stops rotating. Rotation of the registration roller pair 98 is timed to convey the recording medium P toward the secondary transfer nip such that the recording medium P meets the color toner image on the intermediate transfer belt 92 at the secondary transfer nip.

At the secondary transfer nip, the secondary transfer roller 94 supplied with a bias secondarily transfers the color toner image, constructed of the yellow, magenta, cyan, and black toner images superimposed one atop another, from the intermediate transfer belt 92 onto the recording medium P passing through the secondary transfer nip between the intermediate transfer belt 92 and the secondary transfer roller 94. In short, in a secondary transfer process, the color toner image moves in a direction S2 from the intermediate transfer belt 92 to the recording medium P as illustrated in FIG. 2.

After the color toner image is secondarily transferred onto the recording medium P at the secondary transfer nip, the recording medium P bearing the color toner image is conveyed in a direction S3 to reach a position of a fixing device 99, which includes a pressure roller 991 and a heating roller 992, as illustrated in FIG. 2. At the position of the fixing device 99, the color toner image, which has been secondarily transferred onto the recording medium R is fixed onto the recording medium P under heat and pressure from the pressure roller 991 and the heating roller 992. Thus, the printer part 932 forms an image on a recording medium P.

Figure 3:
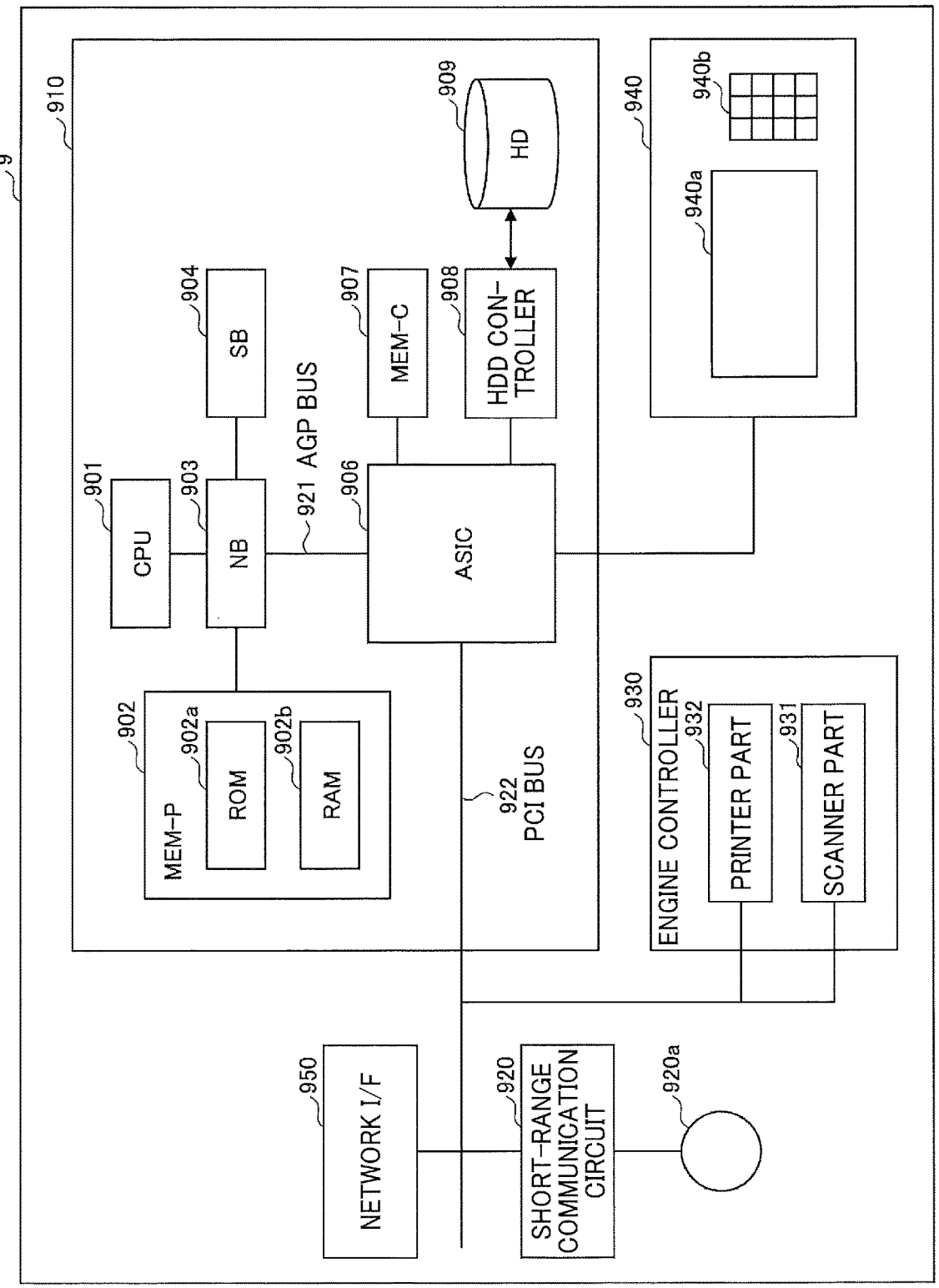
FIG. 3 is a block diagram illustrating a hardware configuration of the image forming apparatus.

Referring now to FIG. 3, a description is given of a hardware configuration of the image forming apparatus 9.

FIG. 3 is a block diagram illustrating an example of the hardware configuration of the image forming apparatus 9.

As illustrated in FIG. 3, the image forming apparatus 9 includes a controller 910, a short-range communication circuit 920, an engine controller 930, an operation panel 940, and a network interface (I/F) 950.

The controller 910 includes a central processing unit (CPU) 901 as a main processor, a system memory (MEM-P) 902, a north bridge (NB) 903, a south bridge (SB) 904, an application specific integrated circuit (ASIC) 906, a local memory (MEM-C) 907, a hard disk drive (HDD) controller 908, and a hard disk or hard drive (HD) 909 as a storage. The NB 903 and the ASIC 906 are connected to each other by an accelerated graphics port (AGP) bus 921.

The CPU 901 controls an entire operation of the image forming apparatus 9. The NB 903 connects the CPU 901, the MEM-P 902, the SB 904, and the AGP bus 921 to each other. The NB 903 includes a memory controller, a peripheral component interconnect (PCI) master, and an AGP target. The memory controller controls reading and writing data to and from the MEM-P 902.

The MEM-P 902 includes a read only memory (ROM) 902*a* and a random access memory (RAM) 902*b*. The ROM 902*a* stores data and program for implementing various functions of the controller 910. The RAM 902*b* is used to load the program and the data. The RAM 902*b* is also used as a drawing memory to store drawing data for printing.

For the purpose of distribution, the program stored in the RAM 902*b* may be stored in any computer-readable storage medium, such as a compact disc read-only memory (CD-ROM), a compact disc-recordable (CD-R), or a digital versatile disc (DVD), in a file format installable or executable by a computer.

The SB 904 connects the NB 903 to a PCI device and a peripheral device. The ASIC 906 is an integrated circuit (IC) as a hardware component for image processing. The ASIC 906 serves as a bridge that connects the AGP bus 921, a PCI bus 922, the HDD controller 908, and the MEM-C 907 to each other.

The ASIC 906 includes a PCI target, an AGP master, an arbiter (ARB) as a central processor of the ASIC 906, a memory controller that controls the MEM-C 907, a plurality of direct memory access controllers (DMACs) capable of converting coordinates of image data with a hardware logic, and a PCI unit that transfers data between a scanner part 931 and the printer part 932 through the PCI bus 922.

The ASIC 906 may be connected to a universal serial bus (USB) interface, or the Institute of Electrical and Electronics Engineers 1394 (IEEE 1394) interface.

The MEM-C 907 is a local memory, which is used as a buffer storing image data to be copied or a buffer storing data to be coded. The HD 909 is a storage that accumulates image data, font data for printing, and form data. The HDD controller 908 controls reading and writing data from or to the HD 909 under control of the CPU 901.

The AGP bus 921 is a bus interface for a graphics accelerator card, which is proposed to accelerate graphics processing. The AGP bus 921 directly accesses the MEM-P 902 with high throughput to accelerate the graphics accelerator card.

The short-range communication circuit 920 is provided with an antenna 920a. The short-range communication circuit 920 communicates in compliance with near field communication (NFC), Bluetooth (registered trademark), or the like.

The engine controller 930 includes the scanner part 931 and the printer part 932. The operation panel 940 includes a panel display 940a and a button operation part 940b. The panel display 940a is, e.g., a touch panel that displays current settings or a selection screen and that receives a user input. The button operation part 940b is constructed of, e.g., a numeric keypad and a start key. The numeric keypad receives assigned values of image forming parameters such as an image density parameter. The start key receives an instruction to start copying.

The controller 910 controls the image forming apparatus 9 as a whole. For example, the controller 910 controls rendering, communication, and inputs through the operation panel 940. The scanner part 931 or the printer part 932 performs image processing such as error diffusion and gamma conversion.

Note that, in response to an instruction to select a specific application through the operation panel 940 by use of, e.g., an application (or mode) switch key, the image forming apparatus 9 selectively performs a document box function, a copier function, a printer function, and a facsimile function.

When the document box function is selected, the image forming apparatus 9 enters a document box mode to store document data. When the copier function is selected, the image forming apparatus 9 enters a copier mode. When the printer function is selected, the image forming apparatus 9 enters a printer mode. When the facsimile mode is selected, the image forming apparatus 9 enters a facsimile mode.

The network I/F 950 controls data communication with an external device through a network. The short-range communication circuit 920 and the network I/F 950 are electrically connected to the ASIC 906 via the PCI bus 922.

A description is now given of a first embodiment of the present disclosure.

Figure 4:
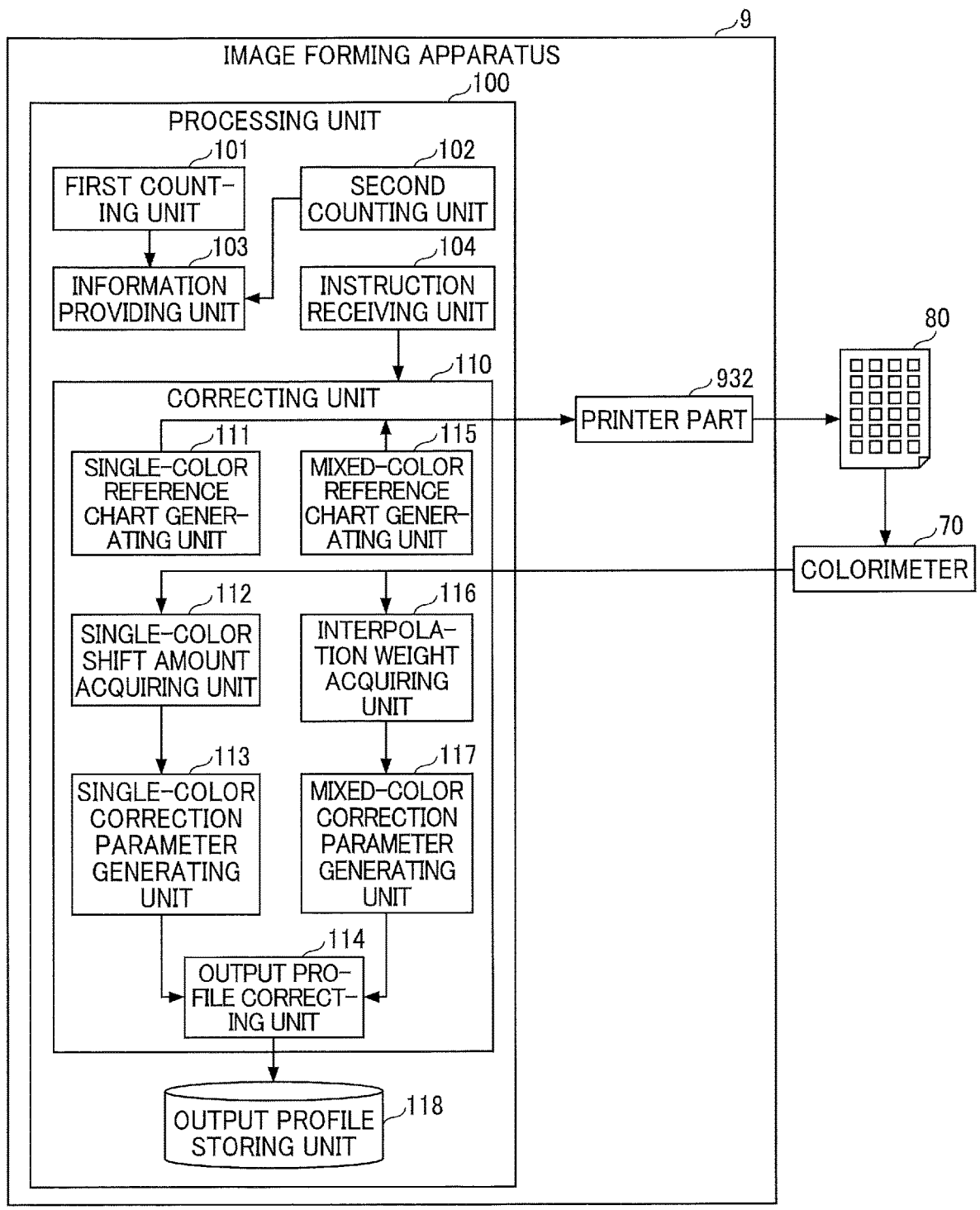
FIG. 4 is a block diagram illustrating a functional configuration of the image forming apparatus according to a first embodiment of the present disclosure.

Initially with reference to FIG. 4, a description is given of a functional configuration of a processing unit 100 of the image forming apparatus 9 according to the first embodiment of the present disclosure.

FIG. 4 is a block diagram illustrating an example of the functional configuration of the processing unit 100 of the image forming apparatus 9 according to the present embodiment.

The processing unit 100 is implemented by, e.g., the controller 910 illustrated in FIG. 3.

As illustrated in FIG. 4, the processing unit 100 includes a first counting unit 101, a second counting unit 102, an information providing unit 103, an instruction receiving unit 104, and a correcting unit 110. Each of the first counting unit 101, the second counting unit 102, the information providing unit 103, and the correcting unit 110 is implemented by the CPU 901 of FIG. 3 executing a given program, for example.

The first counting unit 101 counts the number of recording media P bearing toner images transferred from the intermediate transfer belt 92. The first counting unit 101 then outputs the number counted to the information providing unit 103. For example, the first counting unit 101 counts the number of drive instructions given to the transfer driving roller 93 and the secondary transfer roller 94 of FIG. 2 to transfer the toner images onto the recording media P. Thus, the first counting unit 101 counts the number of recording media P bearing the transferred toner images. Although the first counting unit 101 herein counts the number of drive instructions as an example, the first counting unit 101 may count the number of another kind of instructions or operations indicating that the transfer process is performed on the recording media P. For example, the first counting unit 101 may count or measure the traveling distance of the intermediate transfer belt 92.

The second counting unit 102 counts the number of recording media P bearing the toner images fixed by the fixing device 99. The second counting unit 102 then outputs the number counted to the information providing unit 103. For example, the second counting unit 102 counts the number of drive instructions given to the pressure roller 991 and the heating roller 992 of FIG. 2 to fix the toner images on the recording media P. Thus, the second counting unit 102 counts the number of recording media P bearing the fixed toner images. Although the second counting unit 102 herein counts the number of drive instructions as an example, the second counting unit 102 may count the number of another kind of instructions or operations indicating that the fixing process is performed on the recording media P.

In response to the number of recording media P counted by at least one of the first counting unit 101 and the second counting unit 102 exceeding a threshold, the information providing unit 103 provides information indicating that the mixed-color characteristic is to be corrected. In other words, in response to at least one of the recording media P bearing the transferred toner images counted and the recording media P bearing the fixed toner images counted exceeding a threshold in number, the information providing unit 103 provides information indicating that the mixed-color characteristic is to be corrected. The threshold is obtained in advance by an experiment or a simulation and stored in the ROM 902a, the HD 909, or the like illustrated in FIG. 3. The information providing unit 103 refers to the threshold at the time of determination.

A threshold for the number counted by the first counting unit 101 (i.e., count value of the first counting unit 101) and a threshold for the number counted by the second counting unit 102 (i.e., count value of the second counting unit 102) may be the same or different. Note that the threshold for the count value of the first counting unit 101 and the threshold for the count value of the second counting unit 102 are hereinafter referred to as a first threshold and a second threshold, respectively. In a case in which the first threshold is different from the second threshold, the information providing unit 103 provides the information indicating that the mixed-color characteristic is to be corrected, in at least one of a case in which the count value of the first counting unit 101 exceeds the first threshold and a case in which the count value of the second counting unit 102 exceeds the second threshold.

For example, the information providing unit 103 displays a given message on the panel display 940a illustrated in FIG.

3 to provide the information indicating that the mixed-color characteristic is to be corrected.

Figures 5, 6:
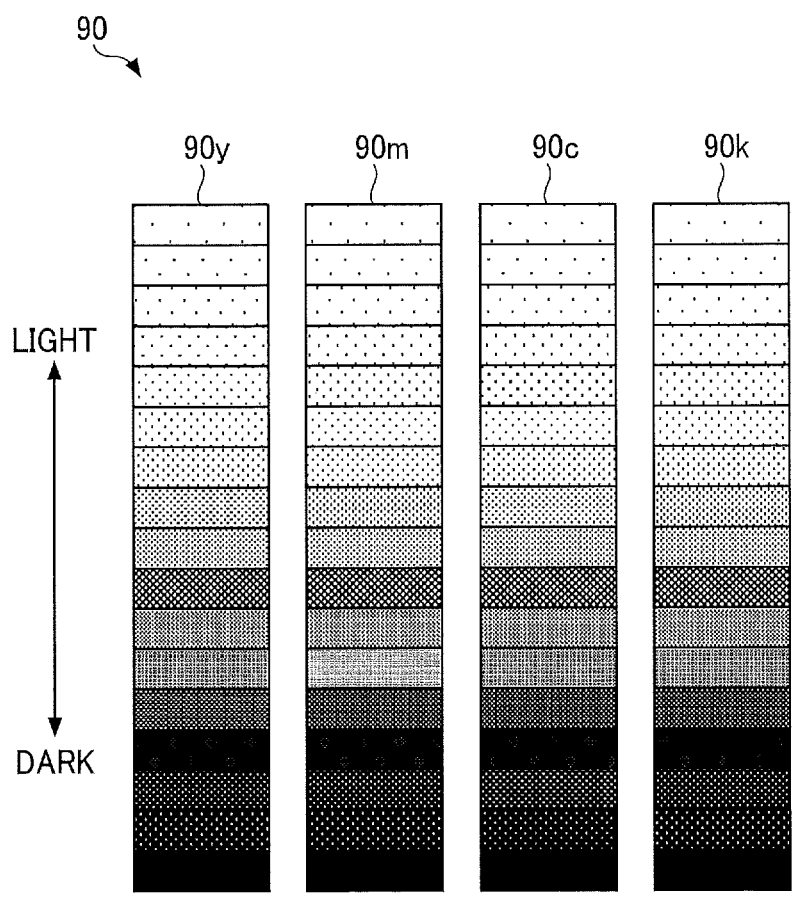
FIG. 5 is a diagram of a screen for providing information indicating that a mixed-color characteristic is to be corrected.
FIG. 6 is a diagram illustrating a configuration of a single-color reference chart.

FIG. 5 is a diagram of a screen 51 with which the information providing unit 103 provides the information indicating that the mixed-color characteristic is to be corrected upon determination that the mixed-color characteristic is to be corrected.

The screen 51 is displayed on the panel display 940a. The message displayed on the screen 51 allows, e.g., a user of the image forming apparatus 9 to ascertain that the mixed-color characteristic is to be corrected. Thus, the message displayed on the screen 51 prompts the user to correct the mixed-color characteristic. The information providing unit 103 herein provides the information to the user of the image forming apparatus 9. Alternatively, the information providing unit 103 may provide the information to an administrator who manages the image forming apparatus 9 or a service person whose work is the maintenance and repair of the image forming apparatus 9.

The information providing unit 103 herein displays the information on the panel display 940a as an example, thus providing the information. Alternatively, the information providing unit 103 may display the information on a monitor of the host computer, for example. Alternatively, the information providing unit 103 may provide the information by sound or perform remote notification via the network I/F 950, for example.

A description will be given later of the reason why the information providing unit 103 can determine that the mixed-color characteristic is to be corrected in response to the number of recording media P counted by at least one of the first counting unit 101 and the second counting unit 102 exceeding the threshold, with a description of factors that cause deviation of the mixed-color characteristic and a description of determination that the mixed-color characteristic is to be corrected.

Referring back to FIG. 4, the instruction receiving unit 104 is implemented by, e.g., the operation panel 940.

The user, for example, notified that the mixed-color characteristic is to be corrected instructs, through the operation panel 940, the image forming apparatus 9 to correct the mixed-color characteristic. In response to the instruction from the user, the instruction receiving unit 104 outputs a signal indicating the instruction to the correcting unit 110 so that the correcting unit 110 corrects the mixed-color characteristic.

The correcting unit 110 includes a single-color reference chart generating unit 111, a single-color shift amount acquiring unit 112, a single-color correction parameter generating unit 113, an output profile correcting unit 114, a mixed-color reference chart generating unit 115, an interpolation weight acquiring unit 116, and a mixed-color correction parameter generating unit 117. With such functional units, the correcting unit 110 corrects the single-color characteristic and the mixed-color characteristic.

The single-color reference chart generating unit 111 generates single-color reference chart data that is used for correction of the single-color characteristic. The single-color reference chart generating unit 111 then outputs the single-color reference chart data to the printer part 932. According to the single-color reference chart data, the printer part 932 forms an image on a recording medium P, thus printing out the single-color reference chart 90. The colorimeter 70 measures the color patches included in the single-color reference chart 90.

The single-color shift amount acquiring unit 112 receives measurement data from the colorimeter 70. Based on the measurement data, the single-color shift amount acquiring unit 112 calculates a gamma curve indicating the relationship between the color tones and density for each color of yellow, magenta, cyan, and black. The single-color shift amount acquiring unit 112 then compares the calculated value with a reference value of the gamma curve for each color to acquire a color shift amount for each color. The single-color shift amount acquiring unit 112 then outputs the color shift amount thus acquired for each color to the single-color correction parameter generating unit 113.

The single-color correction parameter generating unit 113 generates a single-color correction parameter for correction of the gamma curve. The single-color correction parameter generating unit 113 then outputs the single-color correction parameter to the output profile correcting unit 114.

According to the single-color correction parameter received from the single-color correction parameter generating unit 113, the output profile correcting unit 114 corrects an output profile stored in an output profile storing unit 118.

On the other hand, the mixed-color reference chart generating unit 115 generates mixed-color reference chart data that is used for correction of the mixed-color characteristic. The mixed-color reference chart generating unit 115 then outputs the mixed-color reference chart data to the printer part 932. According to the mixed-color reference chart data, the printer part 932 forms an image on a recording medium P, thus printing out the mixed-color reference chart 80. The colorimeter 70 measures the color patches included in the mixed-color reference chart 80.

The interpolation weight acquiring unit 116 receives measurement data from the colorimeter 70. Based on the measurement data and a minimum distance point, the interpolation weight acquiring unit 116 acquires, for each color, interpolation weight data for interpolation of yellow, magenta, cyan, and black values of the mixed-color reference chart 80. Then, the interpolation weight acquiring unit 116 outputs the interpolation weight data thus acquired to the mixed-color correction parameter generating unit 117.

According to the interpolation weight data received from the interpolation weight acquiring unit 116, the mixed-color correction parameter generating unit 117 interpolates the yellow, magenta, cyan, and black values of the mixed-color reference chart 80 to generate a mixed-color correction parameter. Then, the mixed-color correction parameter generating unit 117 outputs the mixed-color correction parameter to the output profile correcting unit 114.

According to the mixed-color correction parameter received from the mixed-color correction parameter generating unit 117, the output profile correcting unit 114 corrects an output profile stored in the output profile storing unit 118.

The output profile thus corrected by the correcting unit 110 is used by the image forming apparatus 9 to convert a color space of image data (i.e., document data), which has been converted to have a common color space, into a color space unique to the image forming apparatus 9. The image forming apparatus 9 performs image formation after the image forming color gamut is limited, by the color space conversion using the output profile, to an image forming color gamut reproducible by the image forming apparatus 9. Thus, the image forming apparatus 9 reproduces the color characteristics of single colors and mixed colors as appropriate.

Referring now to FIG. 6, a description is given of a configuration of the single-color reference chart 90.

FIG. 6 is a diagram illustrating an example of the configuration of the single-color reference chart 90.

The single-color reference chart 90 includes a single-color patch group 90y for yellow, a single-color patch group 90m for magenta, a single-color patch group 90c for cyan, and a single-color patch group 90k for black. Each of the single-color patch groups 90y, 90m, 90c, and 90k includes a plurality of color patches having different densities. The colors of the color patches gradually become darker from the top to the bottom in FIG. 6. The gamma curve is obtainable for each color by measuring the color patches of yellow, magenta, cyan, and black included in the single-color reference chart 90 with the colorimeter 70.

Figure 7:
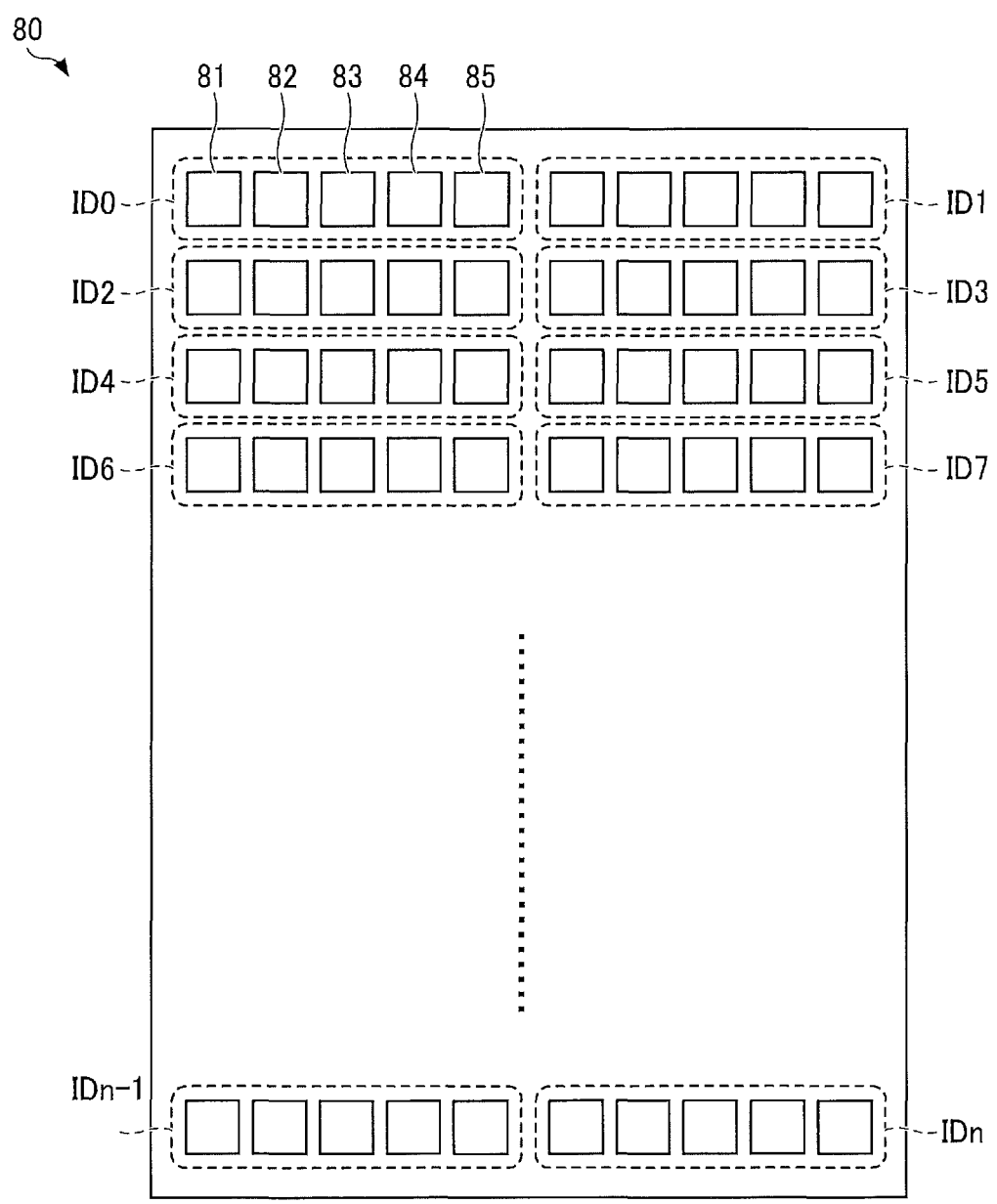
FIG. 7 is a diagram illustrating a configuration of a mixed-color reference chart.

Referring now to FIG. 7, a description is given of a configuration of the mixed-color reference chart 80.

FIG. 7 is a diagram illustrating an example of the configuration of the mixed-color reference chart 80.

The mixed-color reference chart 80 includes single-color patches of yellow, magenta, cyan, and black together with mixed-color patches in which single-color colorants are superimposed one atop another. In the mixed color reference chart 80, a patch group including patches 81 to 85 corresponds to each of correction control points ID0 to IDn. As illustrated in FIG. 7, a patch group corresponding to one correction control point includes five color patches having yellow, magenta, and cyan (YMC) values converted into hue, saturation, lightness (HSL) values. Four of the five color patches have values inversely transformed after hue and saturation (HS) values are displaced. The rest of the five color patches has values not displaced. That is, the color patches of "correction control points×5" are arranged in the mixed-color reference chart 80.

Note that the correcting unit 110 corrects the single-color characteristic and the mixed-color characteristic by, e.g., a general way.

Figure 8:
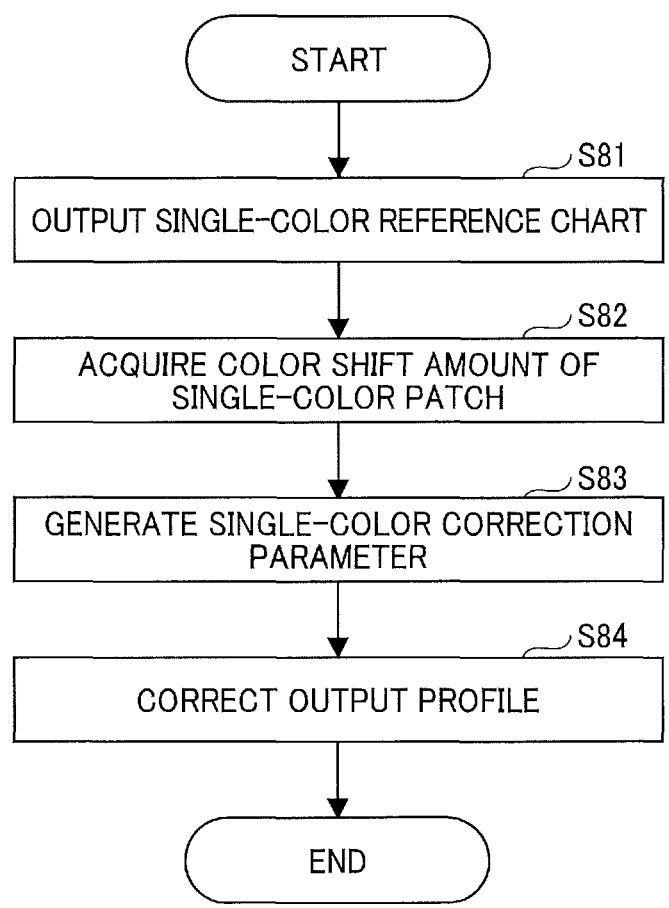
FIG. 8 is a flowchart illustrating a process of correcting a single-color characteristic performed by the image forming apparatus.
Figure 9:
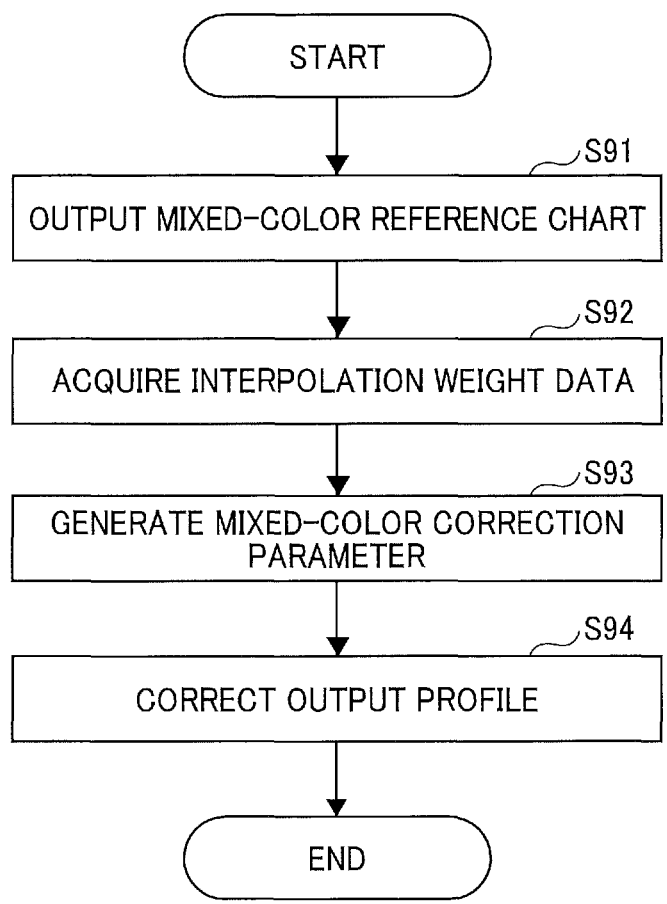
FIG. 9 is a flowchart illustrating a process of correcting the mixed-color characteristic performed by the image forming apparatus.
Figure 10:
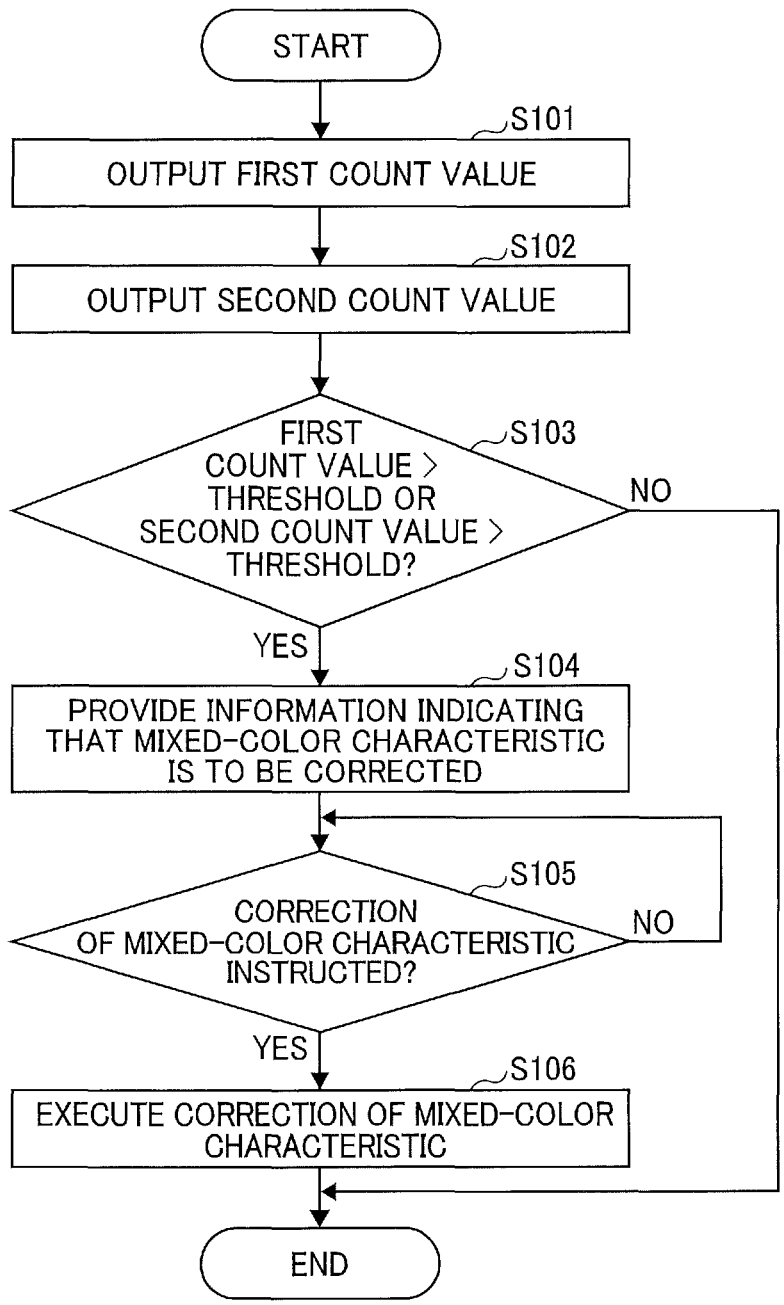
FIG. 10 is a flowchart illustrating a process of providing information performed by the image forming apparatus according to the first embodiment of the present disclosure.

Referring now to FIGS. 8 to 10, a description is given of some processes performed by the image forming apparatus 9 (specifically, the processing unit 100 of the image forming apparatus 9) according to the first embodiment of the present disclosure.

Initially with reference to FIG. 8, a description is given of a process of correcting the single-color characteristic performed by the image forming apparatus 9.

FIG. 8 is a flowchart illustrating an example of the process of correcting the single-color characteristic performed by the image forming apparatus 9.

In step S81, the single-color reference chart generating unit 111 generates single-color reference chart data, which is used for correction of the single-color characteristic, and outputs the single-color reference chart data to the printer part 932. According to the single-color reference chart data, the printer part 932 forms an image on a recording medium P, thus printing out the single-color reference chart 90. The colorimeter 70 measures the color patches included in the single-color reference chart 90.

Subsequently in step S82, the single-color shift amount acquiring unit 112 receives measurement data from the colorimeter 70 and calculates a gamma curve indicating the relationship between the color tones and density for each color of yellow, magenta, cyan, and black. The single-color shift amount acquiring unit 112 then compares the calculated value with a reference value of the gamma curve for each color to acquire a color shift amount for each color. The single-color shift amount acquiring unit 112 then outputs the color shift amount thus acquired for each color to the single-color correction parameter generating unit 113.

Subsequently in step S83, the single-color correction parameter generating unit 113 generates a single-color correction parameter for correction of the gamma curve and outputs the single-color correction parameter to the output profile correcting unit 114.

Subsequently in step S84, the output profile correcting unit 114 corrects an output profile stored in the output profile storing unit 118, according to the single-color correction parameter received from the single-color correction parameter generating unit 113.

Thus, the image forming apparatus 9 corrects the single-color characteristic.

Referring now to FIG. 9, a description is given of a process of correcting the mixed-color characteristic performed by the image forming apparatus 9.

FIG. 9 is a flowchart illustrating an example of the process of correcting the mixed-color characteristic performed by the image forming apparatus 9.

In step S91, the mixed-color reference chart generating unit 115 generates mixed-color reference chart data that is used for correction of the mixed-color characteristic and outputs the mixed-color reference chart data to the printer part 932. According to the mixed-color reference chart data, the printer part 932 forms an image on a recording medium P, thus printing out the mixed-color reference chart 80. The colorimeter 70 measures the color patches included in the mixed-color reference chart 80.

Subsequently in step S92, the interpolation weight acquiring unit 116 receives measurement data from the colorimeter 70 and acquires, for each color, interpolation weight data for interpolation of yellow, magenta, cyan, and black values of the mixed-color reference chart 80 based on the measurement data and a minimum distance point. Then, the interpolation weight acquiring unit 116 outputs the interpolation weight data thus acquired to the mixed-color correction parameter generating unit 117.

Subsequently in step S93, the mixed-color correction parameter generating unit 117 interpolates the yellow, magenta, cyan, and black values of the mixed-color reference chart 80 according to the interpolation weight data received from the interpolation weight acquiring unit 116, to generate a mixed-color correction parameter. Then, the mixed-color correction parameter generating unit 117 outputs the mixed-color correction parameter to the output profile correcting unit 114.

Subsequently in step S94, the output profile correcting unit 114 corrects an output profile stored in the output profile storing unit 118, according to the mixed-color correction parameter received from the mixed-color correction parameter generating unit 117.

Thus, the image forming apparatus 9 corrects the mixed-color characteristic. Note that the image forming apparatus 9 may perform the process of correcting the single-color characteristic to correct the single-color characteristic to a target accuracy and then correct the mixed-color characteristic. The processing unit 100 may perform the process of correcting the single-color characteristic and the process of correcting the mixed-color characteristic at the same time by use of a mixed-color reference chart including the color patches of the single-color reference chart 90 and the color patches of the mixed-color reference chart 80 arranged on a common base.

Referring now to FIG. 10, a description is given of a process of providing information indicating that the mixed-color characteristic is to be corrected, performed by the image forming apparatus 9.

FIG. 10 is a flowchart illustrating an example of the process of providing information indicating that the mixed-color characteristic is to be corrected, performed by the image fainting apparatus 9.

In step S101, the first counting unit 101 counts the number of recording media P bearing toner images transferred from the intermediate transfer belt 92 and outputs the number counted, as a first count value, to the information providing unit 103.

Subsequently in step S102, the second counting unit 102 counts the number of recording media P bearing the toner images fixed by the fixing device 99 and outputs the number counted, as a second count value, to the information providing unit 103.

Subsequently in step S103, the information providing unit 103 determines whether the number of recording media P counted by at least one of the first counting unit 101 and the second counting unit 102 exceeds a threshold.

When the information providing unit 103 determines that the number of recording media P counted by at least one of the first counting unit 101 and the second counting unit 102 does not exceed the threshold (No in step S103), the image forming apparatus 9 ends the process.

By contrast, when the information providing unit 103 determines that the number of recording media P counted by at least one of the first counting unit 101 and the second counting unit 102 exceeds the threshold (YES in step S103), the process proceeds to step S104.

In step S104, the information providing unit 103 displays a given message on the panel display 940a illustrated in FIG. 3, to provide the information indicating that the mixed-color characteristic is to be corrected. The information provided by the information providing unit 103 allows a user who uses the image forming apparatus 9, an administrator who manages the image forming apparatus 9, and the like to ascertain that the mixed-color characteristic is to be corrected.

Subsequently in step S105, the instruction receiving unit 104 determines whether the correction of the mixed-color characteristic is instructed from, e.g., the user.

When the instruction receiving unit 104 determines that the correction of the mixed-color characteristic is not instructed (NO in step S105), the determination in step S105 is performed again. That is, the determination in step S105 is repeated until the correction of the mixed-color characteristic is instructed.

By contrast, when the instruction receiving unit 104 determines that the correction of the mixed-color characteristic is instructed (YES in step S105), the instruction receiving unit 104 accepts the user instruction and outputs a signal indicating the instruction to the correcting unit 110.

Subsequently in step S106, the correcting unit 110 corrects the mixed-color characteristic in response to the input signal from the instruction receiving unit 104.

Thus, the image forming apparatus 9 provides the information indicating that the mixed-color characteristic is to be corrected to, e.g., the user of the image forming apparatus 9.

Now, a description is given of the factors that cause deviation of the mixed-color characteristic.

As described above with reference to FIG. 2, the printer part 932 performs a series of image forming processes, such as the charging process, the exposure process, and the developing process, to form a single-color toner image on each of the photoconductors 91. However, when a deviation from an ideal state (or ideal process condition) occurs in each process, the monochromatic gamma curve of each color may deviate from the ideal state.

For example, since the potential drop characteristic due to the exposure of the surface of the photoconductor 91 changes depending on the temperature and humidity, the monochromatic gamma curve of each color may deviate from the ideal state with the change in the potential drop characteristic. As another example, after the image formation is continuously performed on a large number of recording media or after a period of time in which an image forming apparatus is left unattended and no image formation is performed, the state of charged toner may deviate from the ideal state, resulting in deviation of the monochromatic gamma curve of each color from the ideal state.

The deviation of the monochromatic gamma curve of each color from the ideal state can be corrected by correction of the single-color characteristic. As described above, the toner images are superimposed one atop another on the intermediate transfer belt 92. Specifically, after the yellow toner image is primarily transferred from the photoconductor 91Y onto the intermediate transfer belt 92, the other single-toner images (i.e., magenta, cyan, and black toner images) are superimposed one atop another on the yellow toner image in a primary transfer process. The single-color toner images thus superimposed are secondary transferred onto a recording medium P in the secondary transfer process and fixed onto the recording medium P in the fixing process. In a case in which the deviation from the ideal state occurs in such processes, the correction of the monochromatic gamma curve might be insufficient for an appropriate correction of all color tones including mixed colors.

More specifically, in a case in which a reverse transfer characteristic deviates from an ideal state in the primary transfer process, the mixed-color tone may deviate from an ideal state. Note that the reverse transfer refers to a phenomenon in which a part of the toner primarily transferred from the photoconductor 91 (illustrated in FIG. 2) onto the intermediate transfer belt 92 returns to the photoconductor 91.

Relatedly, in a case in which a secondary transfer rate deviates from an ideal state in the secondary transfer process, the mixed-color tone may deviate from the ideal state. Further, in a case in which a spreading characteristic of fixed toner deviates from an ideal state due to the fixing temperature and the fixing pressure in the fixing process, the mixed-color tone may deviate from the ideal state.

Since the mixed-color tone is produced by toner of single colors superimposed one atop another, the correction of the single-color characteristic might be insufficient for an appropriate correction of the mixed-color tone.

Referring now to FIGS. 11 to 13B, a description is given of impacts on the mixed-color characteristic in the primary transfer process.

Figure 11:
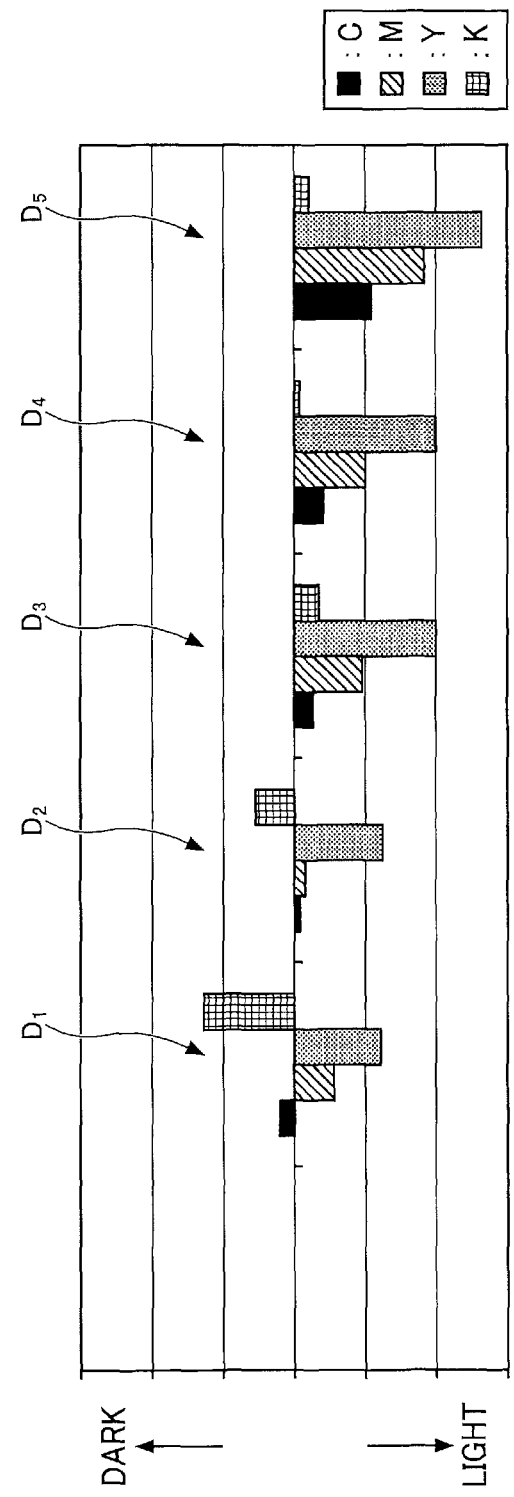
FIG. 11 is a graph illustrating an experimental result of a single-color tone shift due to changes in primary transfer current.
Figure 12:
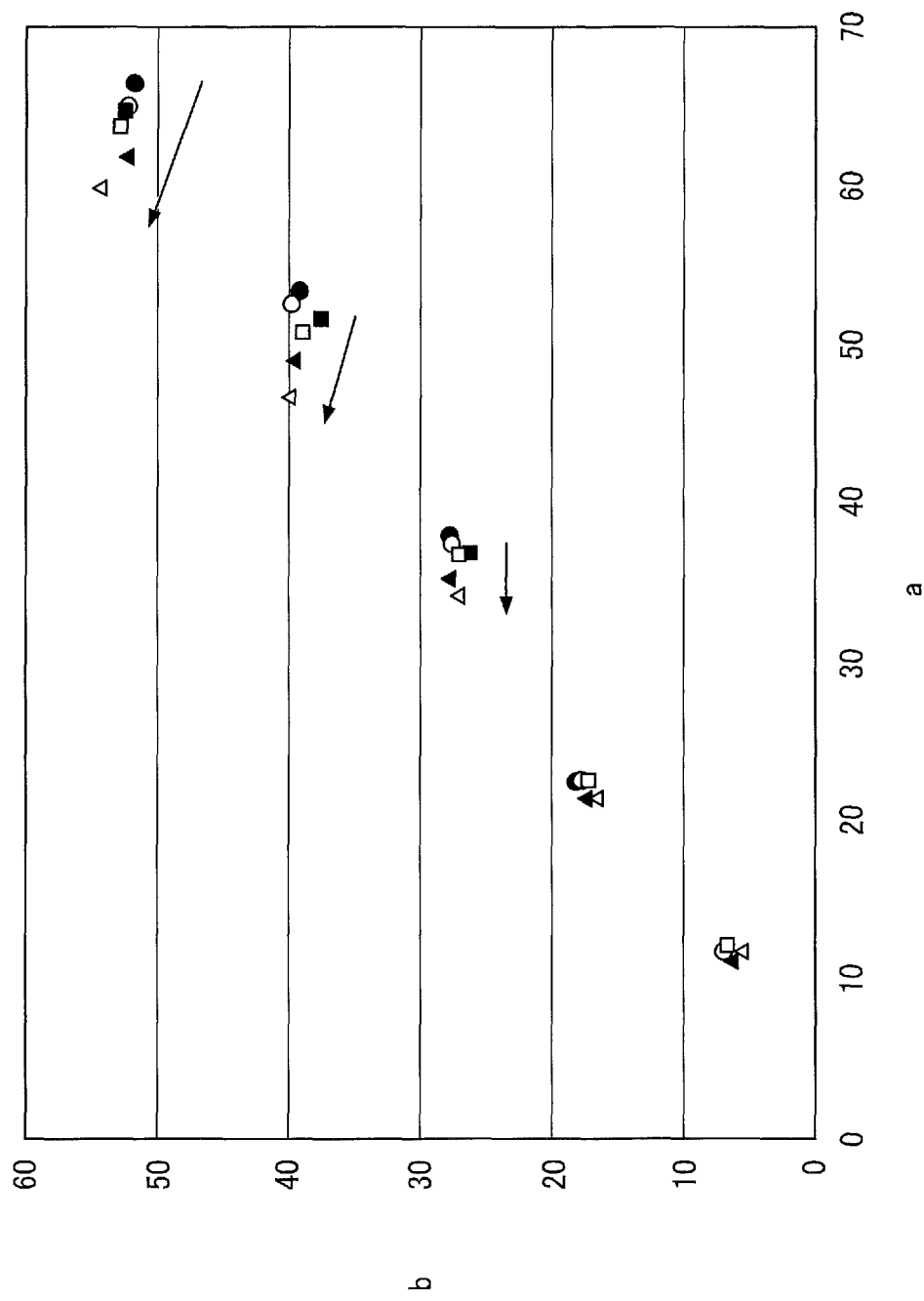
FIG. 12 is a graph illustrating an experimental result of a mixed-color hue shift due to changes in primary transfer current.

Specifically, with reference to FIGS. 11 and 12, a description is given of results of experiments for confirming the deviation of the mixed-color characteristic from the ideal state in a case in which the primary transfer process deviates from an ideal state.

FIG. 11 is a graph illustrating an experimental result of a single-color tone shift due to changes in primary transfer current.

In FIG. 11, the vertical axis indicates the color density, which becomes higher upward and lower downward.

FIG. 11 illustrates color differences for each of the four color patches, namely, the yellow, magenta, cyan, and black patches, caused by changes in the primary transfer current at five levels. Specifically, the color differences from a normal state are illustrated for each of the yellow, magenta, cyan, and black patches. The primary transfer current increases rightwards, from level $D_1$ to level $D_5$ in FIG. 11.

As the primary transfer current increases, the transferability increases while an amount of toner reversely transferred increases. Since the reverse transfer reduces the amount of toner on the intermediate transfer belt 92, the color density of the toner image decreases. A single color Y (i.e., single color of yellow) is primarily transferred onto the intermediate transfer belt 92 first among the four colors of yellow, cyan, magenta, and black. In FIG. 11, the single color Y is greatly affected by the reverse transfer and has a lower density as the primary transfer current value increases.

FIG. 12 is a graph illustrating an experimental result of a mixed-color hue shift due to changes in primary transfer current.

A mixed color R means a mixed color of red produced by single colors superimposed one atop another.

In FIG. 12, the horizontal axis indicates value "a" of the Lab colorimetric values of the mixed color R; whereas the vertical axis indicates value "b" of the Lab colorimetric values of the mixed color R. The experimental result is plotted per level. Each black dot indicates a case in which the primary transfer current is in the normal state. Each white dot indicates a case in which the primary transfer current is at level $D_1$. Each black square indicates a case in which the primary transfer current is at level $D_2$. Each white square indicates a case in which the primary transfer current is at level $D_3$. Each black triangle indicates a case in which the primary transfer current is at level $D_4$. Each white triangle indicates a case in which the primary transfer current is at level $D_5$.

As the primary transfer current increases, the plots shift in a direction indicated by arrow in FIG. 12. That is, as the primary transfer current increases, magenta toner superimposed on yellow toner decreases due to the reverse transfer. In other words, a yellow component increases relative to a magenta component. As a consequence, the mixed color R changes to a strong yellowish red.

Figure 13A:
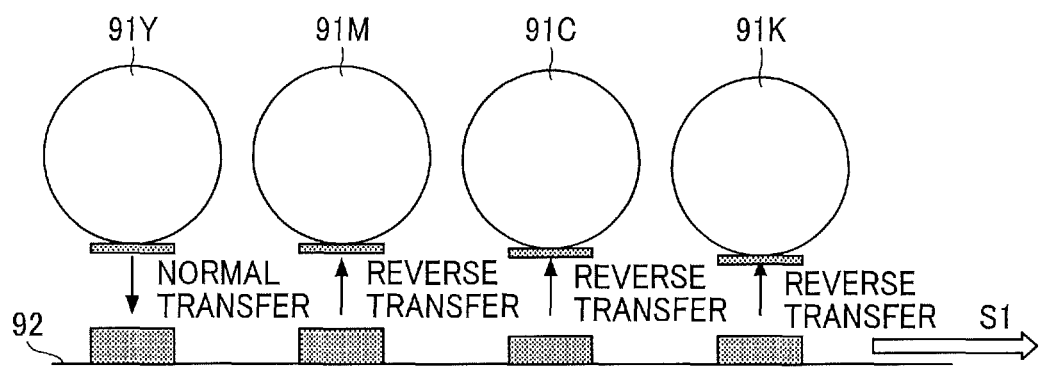
FIG. 13A is a diagram illustrating reverse transfer of a single-color toner image.
Figure 13B:
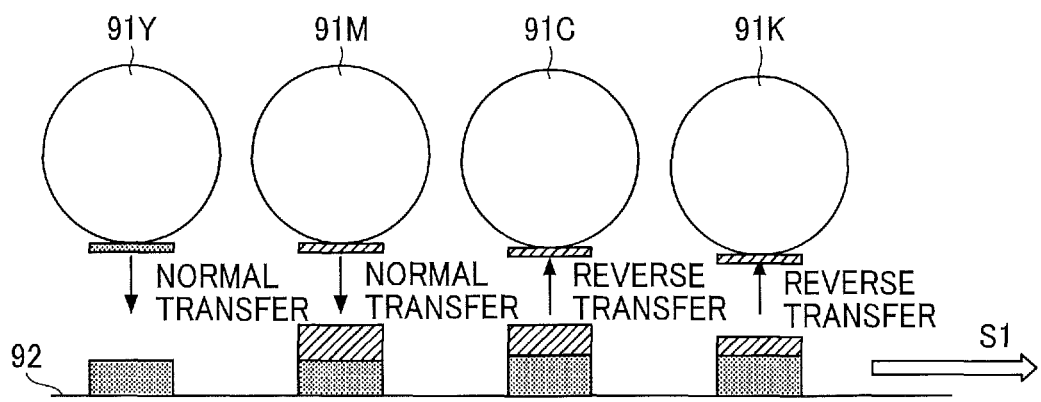
FIG. 13B is a diagram illustrating reverse transfer of a mixed-color toner image.

Referring now to FIGS. 13A and 13B, a description is given of impacts of the reverse transfer on the single and mixed colors.

FIG. 13A is a diagram illustrating the reverse transfer of a single-color toner image. FIG. 13B is a diagram illustrating the reverse transfer of a mixed-color toner image.

In FIG. 13A, the yellow toner is normally transferred onto the intermediate transfer belt 92 from the photoconductor 91Y firstly among the four photoconductors 91. The yellow toner on the intermediate transfer belt 92 is reversely transferred onto the photoconductors 91M, 91C, and 91K in the subsequent processes of primary transfer of the magenta toner, cyan toner, and black toner from the photoconductors 91M, 91C, and 91K, respectively. As the primary transfer current increases, the amount of the yellow toner reversely transferred increases. Thus, the density of yellow is reduced.

FIG. 13B illustrates a state in which the magenta toner is primarily transferred onto the yellow toner, producing the mixed color R. The magenta toner on the yellow toner is reversely transferred onto the photoconductors 91C and 91K in the subsequent processes of primary transfer of the cyan toner and the black toner from the photoconductors 91C and 91K, respectively. As the primary transfer current increases, the amount of the magenta toner reversely transferred increases. Thus, the amount of the magenta toner included in the mixed color R decreases. As a consequence, the mixed color R changes to a strong yellowish red.

As described above, in a case in which the deviation from the ideal state occurs in the primary transfer process and in a case in which the single color Y has a lower density, the single color Y is corrected to have a higher density. By contrast, the mixed color R has a darker yellow component. Therefore, correction of the single color Y is insufficient for an appropriate correction of the mixed color R. Accordingly, the mixed-color characteristic is to be corrected.

Note that, in the above-described experiments, the primary transfer current has changed electric fields between the photoconductors 91 and the intermediate transfer belt 92 to change a primary transfer rate. The electric fields between the photoconductors 91 and the intermediate transfer belt 92 change due to, e.g., deterioration of the intermediate transfer belt 92 with time, generating similar phenomena as in the above-described experiments.

Referring now to FIGS. 14 and 15, a description is given of impacts on the mixed-color characteristic in the secondary transfer process.

Specifically, a description is given of results of experiments for confirming the deviation of the mixed-color characteristic from the ideal state in a case in which the secondary transfer process deviates from an ideal state.

FIG. 14 is a graph illustrating an experimental result of a single-color tone shift due to changes in secondary transfer current.

In FIG. 14, the vertical axis indicates the color density, which becomes higher upward and lower downward.

FIG. 14 illustrates the color differences for each of the four color patches, namely, the yellow, magenta, cyan, and black patches, caused by changes in the primary transfer current at five levels. Specifically, the color differences from a normal state are illustrated for each of the yellow, magenta, cyan, and black patches. The secondary transfer current decreases rightwards, from level $E_1$ to level $E_5$ in FIG. 14. In FIG. 14, as the secondary transfer current decreases, a single color M (i.e., single color of magenta) has a lower density while the single color Y has a stable density.

FIG. 15 is a graph illustrating an experimental result of a mixed-color hue shift due to changes in secondary transfer current.

The graph of FIG. 15 is illustrated in a similar way to the graph of FIG. 12, and therefore, a redundant description thereof is herein omitted unless otherwise required.

As the secondary transfer current decreases, the plots shift in a direction indicated by arrow in FIG. 15. That is, as the secondary transfer current decreases, a less amount of the yellow toner is secondary transferred because the yellow toner rests at the bottom of toner layers on the intermediate transfer belt 92. In other words, as the yellow component decreases, the magenta component increases relative to the yellow component. As a consequence, the mixed color R changes to a strong purplish red.

A smaller amount of toner of a single color adheres to the intermediate transfer belt 92 compared to an amount of toner of a mixed color adhering to the intermediate transfer belt 92. Therefore, almost all the toner of the single color Y is transferred, thus maintaining a certain level of tone even when the transfer rate decreases.

Such a deviation from the ideal state in the secondary transfer process may shift the yellow component of the mixed color R in a lighter direction as illustrated in FIG. 15. However, correction of the single color Y is insufficient to correct the shift of the yellow component of the mixed color R. Accordingly, the mixed-color characteristic is to be corrected.

Note that, in the above-described experiments, the secondary transfer current has changed an electric field between the intermediate transfer belt 92 and a recording medium P to change the secondary transfer rate. The electric field between the intermediate transfer belt 92 and the recording media P changes due to, e.g., deterioration of the intermediate transfer belt 92 with time, generating similar phenomena as in the above-described experiments. The similar phenomena as in the above-described experiments may be also generated by changes in, e.g., electrical resistance or surface shape of the recording medium P.

Referring now to FIGS. 16A to 17B, a description is given of impacts on the mixed-color characteristic in the fixing process.

Specifically, a description is given of results of experiments for confirming the deviation of the mixed-color characteristic from the ideal state in a case in which the fixing process deviates from an ideal state.

Figure 16A:
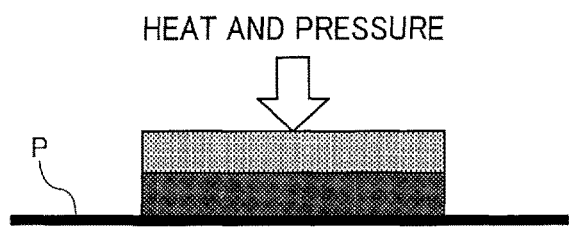
FIG. 16A is a diagram of toner spreading well in a fixing process.
Figure 16B:
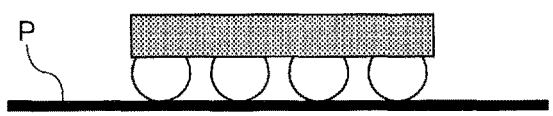
FIG. 16B is a diagram of toner spreading poorly in the fixing process.

FIGS. 16A and 16B illustrate the fixability of toner. Specifically, FIG. 16A is a diagram of toner spreading well in the fixing process. FIG. 16B is a diagram of toner spreading poorly in the fixing process.

In the toner fixing process, generally, heat and pressure are less likely to be transmitted to a lower toner layer compared to an upper toner layer. That is, the lower toner layer is less likely to spread. Due to the spreading characteristic of the lower toner layer, the tone of a mixed color may change.

For example, a mixed color G (i.e., mixed color of green) is generated by the yellow toner as an upper layer superimposed on the cyan toner as a lower layer. When the upper yellow toner layer and the lower cyan toner layer spread as illustrated in FIG. 16A, the yellow toner layer overlaps the cyan toner layer as appropriate, generating the mixed color G without color unevenness.

By contrast, when the fixability decreases, the lower cyan toner layer is localized without sufficiently spreading as illustrated in FIG. 16B. As a consequence, in an area in which the yellow toner layer does not overlap the cyan toner layer, the mixed color G is inappropriately generated, causing color unevenness.

Figure 17A:
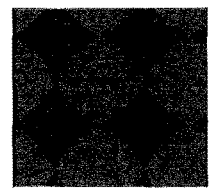
FIG. 17A is a photograph of toner spreading well in a fixing process.
Figure 17B:
FIG. 17B is a photograph of toner spreading poorly in the fixing process.

FIGS. 17A and 17B illustrate the fixability of toner. Specifically, FIG. 17A is a photograph of toner spreading well in the fixing process. FIG. 17B is a photograph of toner spreading poorly in the fixing process.

In FIG. 17A, the yellow toner layer overlaps the cyan toner layer as appropriate, generating the mixed color G without color unevenness. By contrast, in FIG. 17B, the lower cyan toner is localized without sufficiently spreading, thus generating an area in which the yellow toner layer does not overlap the cyan toner layer. In the area in which the yellow toner layer does not overlap the cyan toner layer, the mixed color G is inappropriately generated, causing color unevenness.

The deviation from the ideal state in the fixing process is less likely to affect the tone of a single color because a relatively small amount of toner of a single color is attached to the recording medium P and therefore the toner of the single color spreads sufficiently. By contrast, the deviation from the ideal state in the fixing process is more likely to affect the tone of a mixed color because, as described above, such a deviation may cause an area in which toner layers overlap each other and an area in which the toner layers do not overlap each other.

Such a deviation from the ideal state in the fixing process may shift a cyan component of the mixed color G in a lighter direction. However, correction of a single color C (i.e., single color of cyan) is insufficient to correct the shift of the cyan component of the mixed color G. Accordingly, the mixed-color characteristic is to be corrected.

Now, a description is given of the determination that the mixed-color characteristic is to be corrected.

As described above, the mixed-color characteristic may need to be corrected due to the deviation from the ideal state in the primary transfer process, the secondary transfer process, or the fixing process.

In the primary transfer process and the secondary transfer process, the deviation from the ideal state occurs due to, e.g., changes in resistance value of the intermediate transfer belt 92. Such changes in the resistance value of the intermediate transfer belt 92 have a correlation with, e.g., the number of recording media P bearing transferred toner images and a traveling distance of the intermediate transfer belt 92.

On the other hand, in the fixing process, the deviation from the ideal state occurs due to temporal changes of the pressure roller 991, the heating roller 992, and the like. Such temporal changes of the pressure roller 991, the heating roller 992, and the like have a correlation with the number of the recording media P bearing fixed toner images.

Therefore, in the present embodiment, the first counting unit 101 counts the number of recording media P bearing the toner images transferred from the intermediate transfer belt 92; whereas the second counting unit 102 counts the number of recording medium P bearing the toner images fixed by the fixing device 99. In response to at least one of the number of recording media P bearing the transferred toner images and the number of recording media P bearing the fixed toner images exceeding a given threshold, an appropriate determination is made that the mixed-color characteristic is to be corrected.

Now, a description is given of advantages of the image forming apparatus 9 according to the first embodiment of the present disclosure.

It has been generally difficult to make an appropriate determination that the mixed-color characteristic is to be corrected. Therefore, even when correction of a single-color characteristic can provide a sufficient color characteristic, the mixed-color characteristic may have been unnecessarily corrected. Compared with the correction of the single-color characteristic, the correction of the mixed-color characteristic accompanies time and effort in formation of a relatively large number of color patches and measurement of the color patches one by one. In addition, the correction of the mixed-color characteristic increases the amount of toner consumed for formation of the color patches. To prevent such an unnecessary correction of the mixed-color characteristic, there has been a demand for an image forming apparatus to cause a user to appropriately ascertain that the mixed-color characteristic is to be corrected.

According to the present embodiment, the information providing unit 103 provides the information indicating that the mixed-color characteristic is to be corrected, in response to at least one of recording media P bearing the transferred toner images and recording media P bearing the fixed toner images exceeding a given threshold in number. Accordingly, the user ascertains that the mixed-color characteristic is to be corrected when an appropriate mixed-color characteristic is not acquired.

Since the user does not have to measure a plurality of mixed-color patches to ascertain that the mixed-color characteristic is to be corrected, the user can ascertain without hassle that the mixed-color characteristic is to be corrected.

In a case in which the correction of the mixed-color characteristic automatically proceeds based on determination that the mixed-color characteristic is to be corrected, an unfavorable situation for the user, such as an interruption of image formation, may occur because the correction of the mixed-color characteristic takes time and effort. By contrast, according to the present embodiment, the user simply ascertains that the mixed-color characteristic is to be corrected. That is, the final decision on whether to actually execute the correction of the mixed-color characteristic is left to the user. Thus, the present embodiment prevents occurrence of unfavorable situations for the user such as the interruption of image formation.

Figure 18:
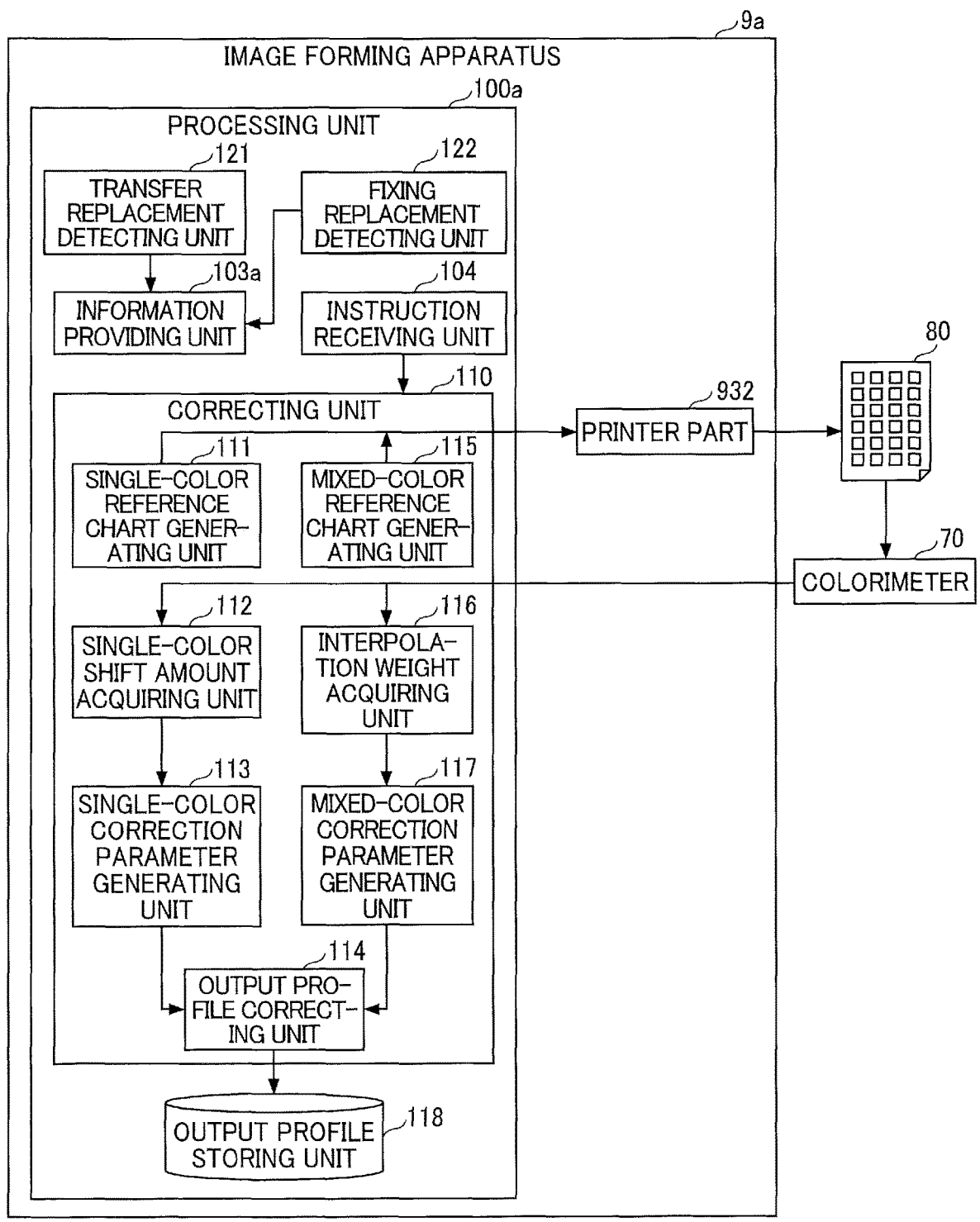
FIG. 18 is a block diagram illustrating a functional configuration of the image forming apparatus according to a second embodiment of the present disclosure.

Referring now to FIG. 18, a description is given of an image forming apparatus according to a second embodiment of the present disclosure. Note that redundant descriptions are herein omitted of components identical to those of the embodiment described above, unless otherwise required.

FIG. 18 is a block diagram illustrating a functional configuration of an image forming apparatus 9*a* according to the present embodiment.

As illustrated in FIG. 18, a processing unit 100*a* of the image forming apparatus 9*a* includes a transfer replacement detecting unit 121, a fixing replacement detecting unit 122, and an information providing unit 103*a*. Each of the transfer replacement detecting unit 121 and the fixing replacement detecting unit 122 is implemented by the CPU 901 of FIG. 3 executing a given program, for example.

In response to a replacement of the intermediate transfer belt 92, the transfer replacement detecting unit 121 outputs a signal indicating the replacement to the information providing unit 103*a*. As an example, the transfer replacement detecting unit 121 receives an output signal from a sensor that detects removal and attachment of the intermediate transfer belt 92, thereby detecting that the intermediate transfer belt 92 is replaced. A detection target of the transfer replacement detecting unit 121 is not limited to the replacement of the intermediate transfer belt 92. The transfer replacement detecting unit 121 may detect a replacement of a power source that supplies a transfer bias or a replacement of at least one of the components of the transfer device 900, such as the transfer driving roller 93 and the secondary transfer roller 94, and output a signal indicating the replacement to the information providing unit 103*a*.

On the other hand, in response to a replacement of the pressure roller 991, the fixing replacement detecting unit 122 outputs a signal indicating the replacement to the information providing unit 103*a*. As an example, the fixing replacement detecting unit 122 receives an output signal from a sensor that detects removal and attachment of the pressure roller 991, thereby detecting that the pressure roller 991 is replaced. A detection target of the fixing replacement detecting unit 122 is not limited to the replacement of the pressure roller 991. The fixing replacement detecting unit 122 may detect a replacement of at least one of the components of the fixing device 99, such as the heating roller 992, and output a signal indicating the replacement to the information providing unit 103*a*. In a case in which the fixing device 99 includes a fixing belt 992B that encompasses a heater, instead of the heating roller 992, for example, the fixing replacement detecting unit 122 may detect a replacement of the fixing belt 992B and output a signal indicating the replacement to the information providing unit 103*a*.

In response to a replacement of at least one of the intermediate transfer belt 92 and the pressure roller 991, the information providing unit 103*a* provides information indicating that the mixed-color characteristic is to be corrected.

The replacement of at least one of the intermediate transfer belt 92 and the pressure roller 991 may shift the mixed-color characteristic. According to the present embodiment, the information providing unit 103*a* provides the information indicating that the mixed-color characteristic is to be corrected, in response to the replacement of at least one of the intermediate transfer belt 92 and the pressure roller 991, thereby allowing a user to ascertain that the mixed-color characteristic is to be corrected when acquisition of an appropriate mixed-color characteristic becomes skeptical. Accordingly, the user ascertains without hassle that the mixed-color characteristic is to be corrected.

Note that the other advantages are the same as the advantages described in the first embodiment.

The present disclosure is not limited to the first and second embodiments described above. Thus, various modifications and enhancements are possible in light of the above teachings, without departing from the scope of the present disclosure.

Now, a description is given of some variations.

Figure 19:
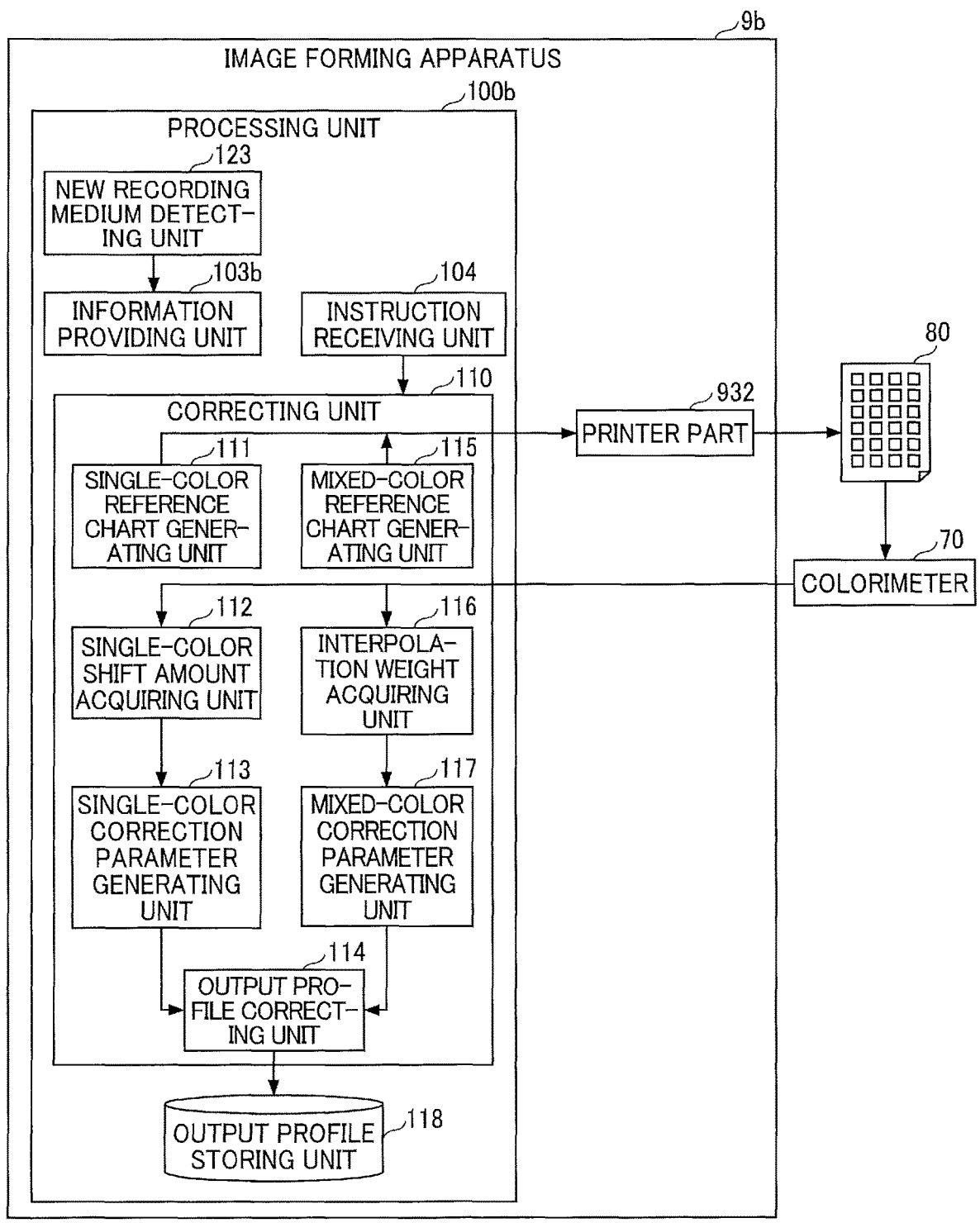
FIG. 19 is a block diagram illustrating a functional configuration of the image forming apparatus according to a first variation.

Initially with reference to FIG. 19, a description is given of a first variation.

FIG. 19 is a block diagram illustrating a functional configuration of an image forming apparatus 9*b* according to the first variation.

As illustrated in FIG. 19, a processing unit 100*b* of the image forming apparatus 9*b* includes a new recording medium detecting unit 123 and an information providing unit 103*b*.

In response to the input tray 95 of FIG. 2 storing a new recording medium P or in response to an addition of a recording medium P, the new recording medium detecting unit 123 outputs a signal indicating that the storage or addition to the information providing unit 103*b*. The new recording medium detecting unit 123 receives an output signal from a sensor that detects the presence or absence of recording media P in the input tray 95, or from a sensor that detects the weight of recording media P, thereby detecting that a recording medium P is stored in the input tray 95.

In response to the input tray 95 storing a new recording medium P, the information providing unit 103*b* provides information indicating that the mixed-color characteristic is to be corrected.

A change of a recording medium P to a new recording medium P may shift the mixed-color characteristic. According to the present embodiment, the information providing unit 103*b* provides the information indicating that the mixed-color characteristic is to be corrected, in response to the input tray 95 storing a new recording medium P, thereby allowing a user to ascertain that the mixed-color characteristic is to be corrected when acquisition of an appropriate mixed-color characteristic becomes skeptical. Accordingly, the user ascertains without hassle that the mixed-color characteristic is to be corrected.

Note that the other advantages are the same as the advantages described in the first and second embodiments.

Figure 20:
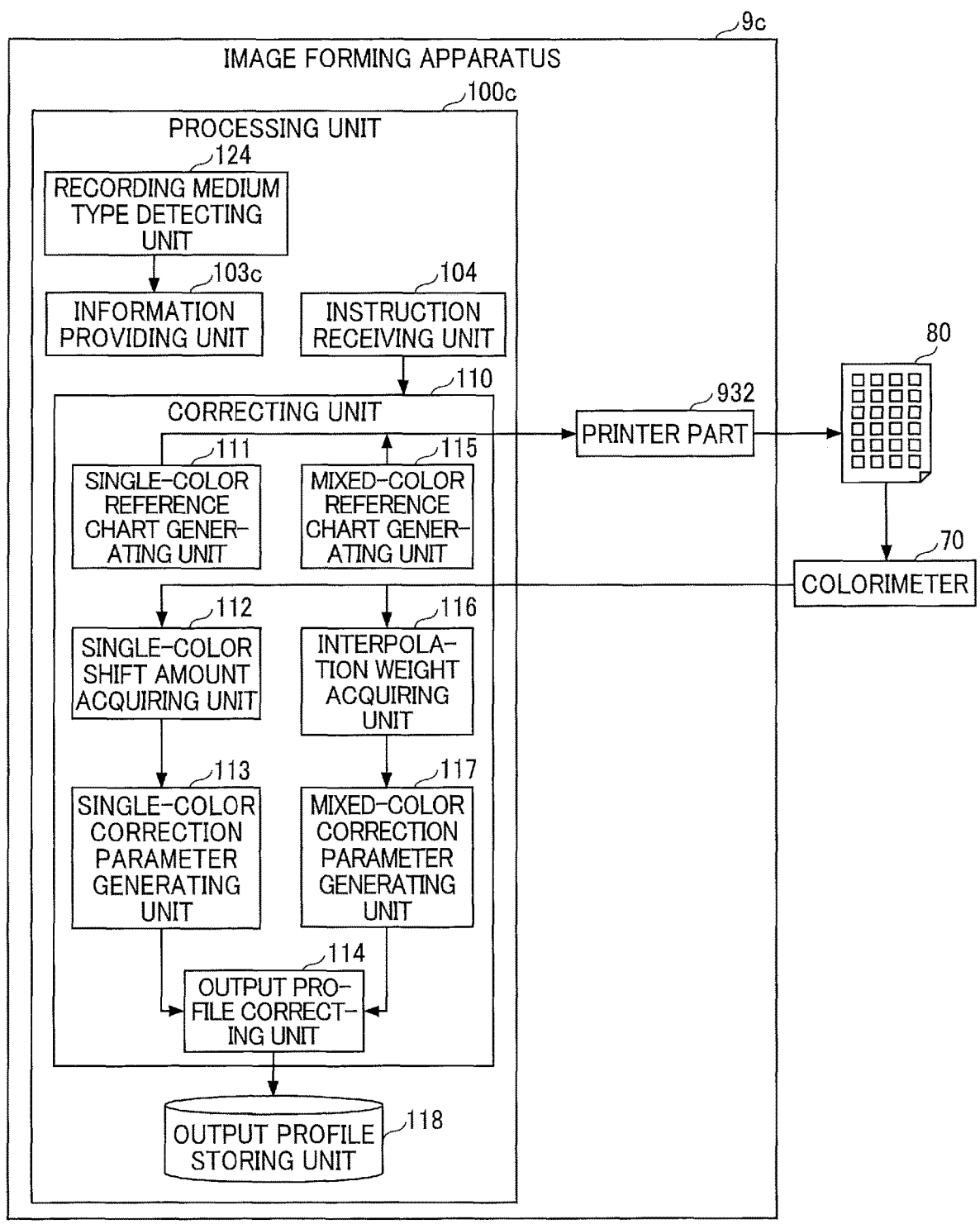
FIG. 20 is a block diagram illustrating a functional configuration of the image forming apparatus according to a second variation.

Referring now to FIG. 20, a description is given of a second variation.

FIG. 20 is a block diagram illustrating a functional configuration of an image forming apparatus 9*c* according to the second variation.

As illustrated in FIG. 20, a processing unit 100*c* of the image forming apparatus 9*c* includes a recording medium type detecting unit 124 and an information providing unit 103*c*.

In response to a change of type of a recording medium P stored in the input tray 95 illustrated in FIG. 2, the recording medium type detecting unit 124 outputs a signal indicating the change to the information providing unit 103*c*. As an example, the recording medium type detecting unit 124 receives identification information of the type of the recording medium P input by a user through the operation panel 940, thereby detecting that the type of the recording medium P is changed. Alternatively, in a case in which the image forming apparatus 9c includes a plurality of input trays 95, the recording medium type detecting unit 124 may detect that the type of the recording medium P is changed based on a change of the input tray 95 from which the recording medium P is supplied.

In response to a change of type of the recording medium P, the information providing unit 103c provides information indicating that the mixed-color characteristic is to be corrected.

A change of type of the recording medium P may shift the mixed-color characteristic. According to the present embodiment, the information providing unit 103c provides the information indicating that the mixed-color characteristic is to be corrected, in response to a change of type of the recording medium P, thereby allowing a user to ascertain that the mixed-color characteristic is to be corrected when acquisition of an appropriate mixed-color characteristic becomes skeptical. Accordingly, the user ascertains without hassle that the mixed-color characteristic is to be corrected.

Note that the other advantages are the same as the advantages described in the first and second embodiments.

Figure 21:
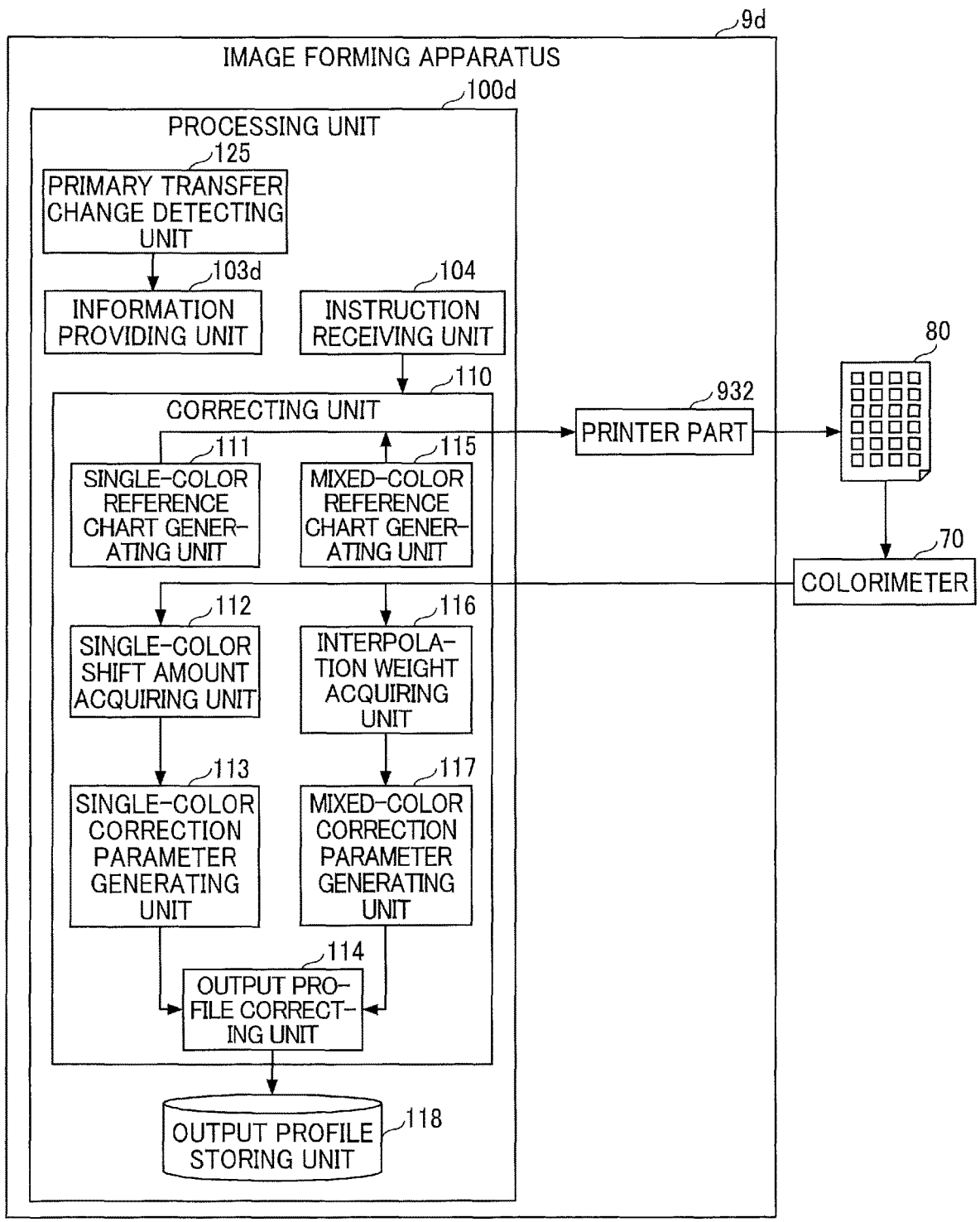
FIG. 21 is a block diagram illustrating a functional configuration of the image forming apparatus according to a third variation.

Referring now to FIG. 21, a description is given of a third variation.

FIG. 21 is a block diagram illustrating a functional configuration of an image forming apparatus 9d according to the third variation.

As illustrated in FIG. 21, a processing unit 100d of the image forming apparatus 9d includes a primary transfer change detecting unit 125 and an information providing unit 103d.

In response to a change of assigned value of a primary transfer current applied to the intermediate transfer belt 92, the primary transfer change detecting unit 125 outputs a signal indicating the change to the information providing unit 103d. As an example, the primary transfer change detecting unit 125 refers to a table recording various assigned values of image forming parameters stored in the HD 909 or the like illustrated in FIG. 2, thereby detecting that the assigned value of the primary transfer current is changed.

In response to a change of assigned value of the primary transfer current that transfers a toner image onto the intermediate transfer belt 92 serving as an intermediate transferor, the information providing unit 103d provides information indicating that the mixed-color characteristic is to be corrected.

A change of assigned value of the primary transfer current may shift the mixed-color characteristic. According to the present embodiment, the information providing unit 103d provides the information indicating that the mixed-color characteristic is to be corrected, in response to a change of assigned value of the primary transfer current, thereby allowing a user to ascertain that the mixed-color characteristic is to be corrected when acquisition of an appropriate mixed-color characteristic becomes skeptical. Accordingly, the user ascertains without hassle that the mixed-color characteristic is to be corrected.

Note that the other advantages are the same as the advantages described in the first and second embodiments.

Figure 22:
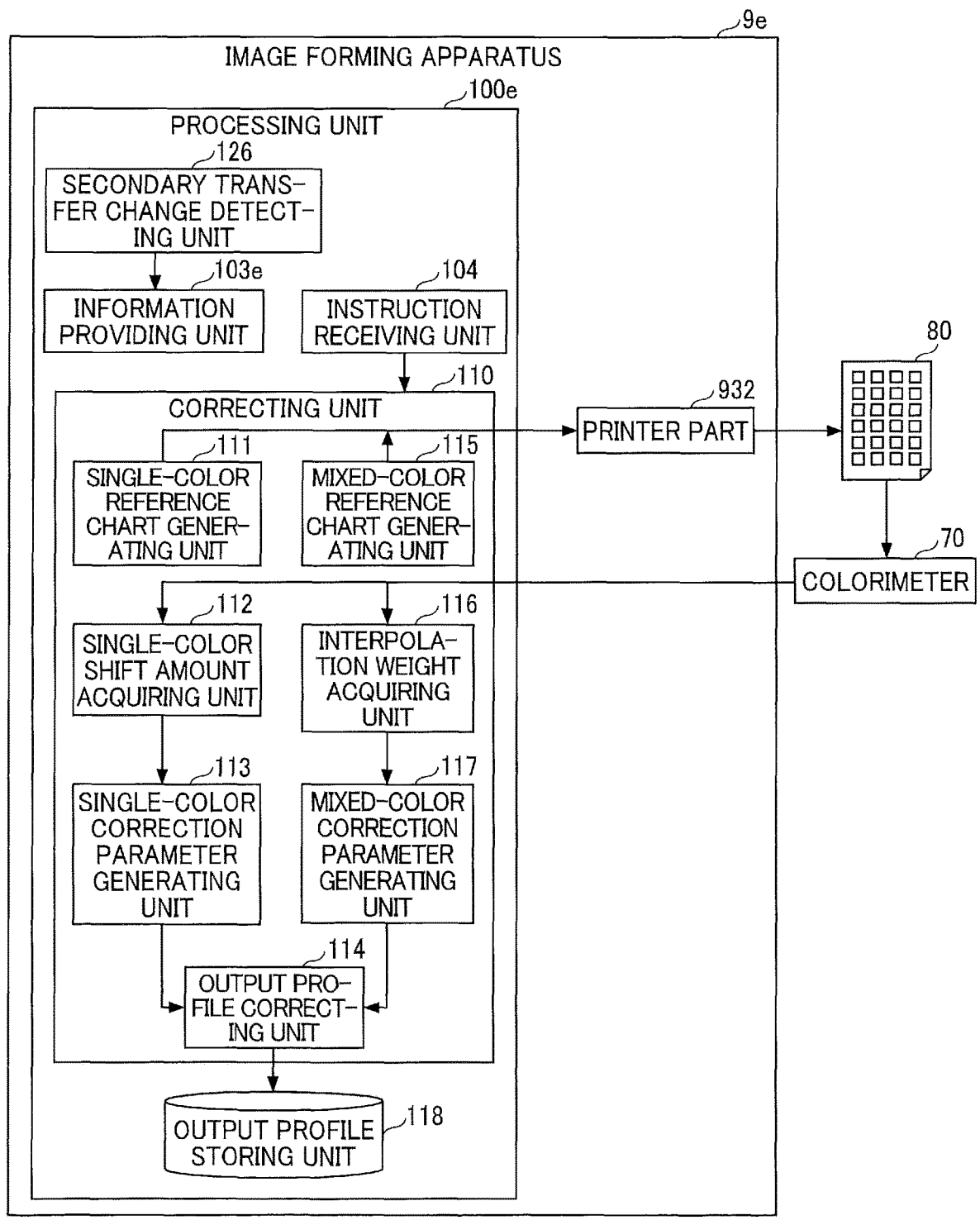
FIG. 22 is a block diagram illustrating a functional configuration of the image forming apparatus according to a fourth variation.

Referring now to FIG. 22, a description is given of a fourth variation.

FIG. 22 is a block diagram illustrating a functional configuration of an image forming apparatus 9e according to the fourth variation.

As illustrated in FIG. 22, a processing unit 100e of the image forming apparatus 9e includes a secondary transfer change detecting unit 126 and an information providing unit 103e.

In response to a change of assigned value of a secondary transfer current applied to the intermediate transfer belt 92, the secondary transfer change detecting unit 126 outputs a signal indicating the change to the information providing unit 103e. As an example, the secondary transfer change detecting unit 126 refers to a table recording various assigned values of image forming parameters stored in the HD 909 or the like illustrated in FIG. 2, thereby detecting that the assigned value of the secondary transfer current is changed.

In response to a change of assigned value of the secondary transfer current that transfers a toner image onto a recording medium P, the information providing unit 103e provides information indicating that the mixed-color characteristic is to be corrected.

A change of assigned value of the secondary transfer current may shift the mixed-color characteristic. According to the present embodiment, the information providing unit 103e provides the information indicating that the mixed-color characteristic is to be corrected, in response to a change of assigned value of the secondary transfer current, thereby allowing a user to ascertain that the mixed-color characteristic is to be corrected when acquisition of an appropriate mixed-color characteristic becomes skeptical. Accordingly, the user ascertains without hassle that the mixed-color characteristic is to be corrected.

Note that the other advantages are the same as the advantages described in the first and second embodiments.

Figure 23:
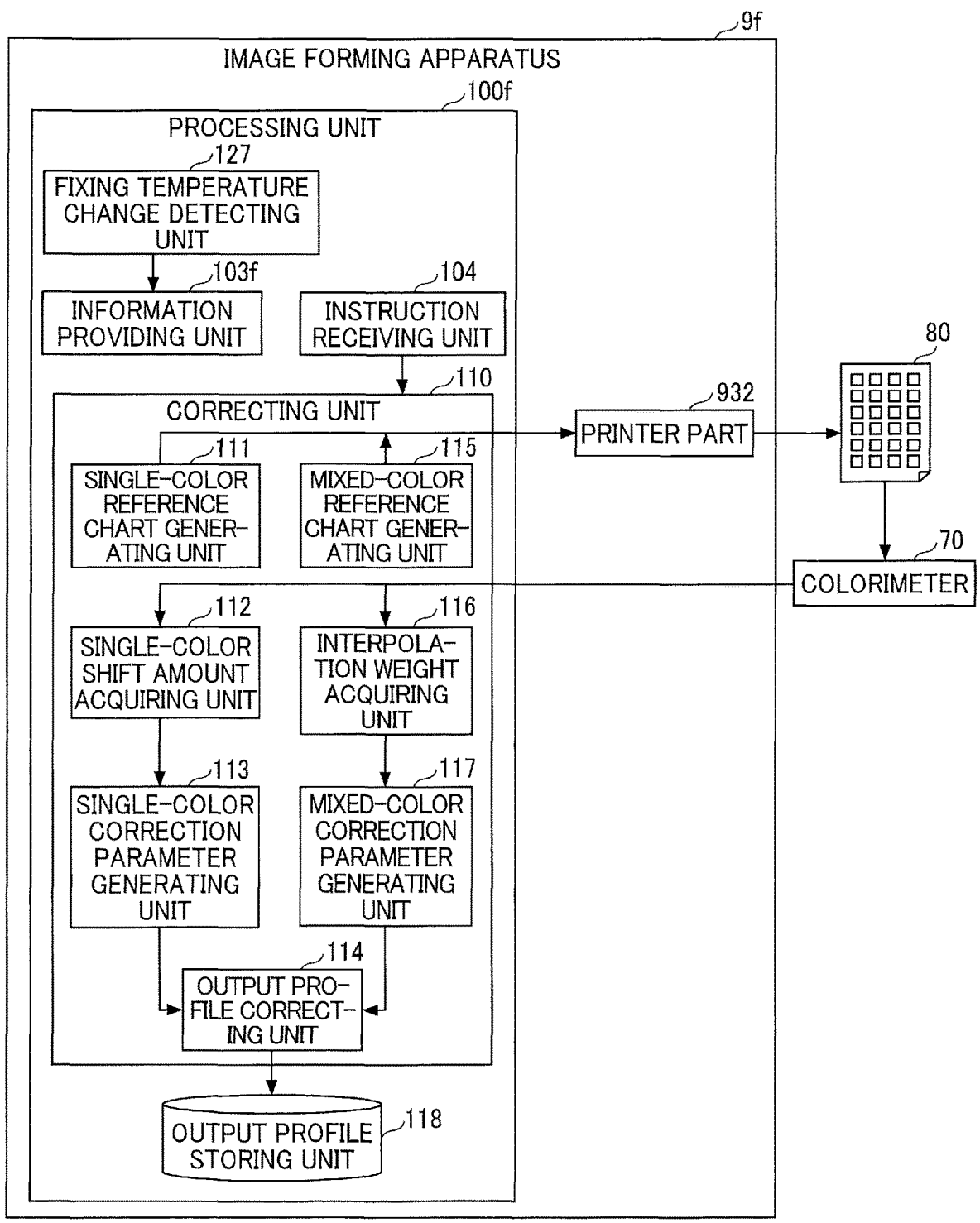
FIG. 23 is a block diagram illustrating a functional configuration of the image forming apparatus according to a fifth variation.

Referring now to FIG. 23, a description is given of a fifth variation.

FIG. 23 is a block diagram illustrating a functional configuration of an image forming apparatus 9f according to the fifth variation.

As illustrated in FIG. 23, a processing unit 100f of the image forming apparatus 9f includes a fixing temperature change detecting unit 127 and an information providing unit 103f.

In response to a change of assigned value of a fixing temperature set for the heating roller 992, the fixing temperature change detecting unit 127 outputs a signal indicating the change to the information providing unit 103f. As an example, the fixing temperature change detecting unit 127 refers to a table recording various assigned values of image forming parameters stored in the HD 909 or the like illustrated in FIG. 2, thereby detecting that the assigned value of the fixing temperature is changed.

In response to a change of assigned value of the fixing temperature at which the fixing device 99 fixes a toner image onto a recording medium P, the information providing unit 103f provides information indicating that the mixed-color characteristic is to be corrected.

A change of assigned value of the fixing temperature may shift the mixed-color characteristic. According to the present embodiment, the information providing unit 103f provides the information indicating that the mixed-color characteristic is to be corrected, in response to a change of assigned value of the fixing temperature, thereby allowing a user to ascertain that the mixed-color characteristic is to be corrected when acquisition of an appropriate mixed-color characteristic becomes skeptical. Accordingly, the user ascertains without hassle that the mixed-color characteristic is to be corrected.

Note that the other advantages are the same as the advantages described in the first and second embodiments.

According to the embodiments described above, a user can ascertain without hassle that the mixed-color characteristic is to be corrected.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

For example, in the embodiments described above, the image forming apparatuses (e.g., image forming apparatus 9) are described as examples of image processing apparatus. However, the image processing apparatus is not limited to the image forming apparatus. Recent production printing apparatuses may include a server-type controller such as a digital front end (DFE) as an external device of an image forming apparatus such as a printer. As an example of the image processing apparatus, such a server-type controller may have the function of the processing unit 100 described in the embodiments. In such a case, the information providing unit 103 may display the screen 51 on a display included in the server-type controller.

In the embodiments described above, the image forming apparatuses (e.g., image forming apparatus 9) are described as electrophotographic image forming apparatuses. However, the image forming apparatuses may be another type of image forming apparatuses such as inkjet image forming apparatuses.

The embodiments include an image processing method. For example, the image processing method includes providing information in response to satisfaction of a given condition. The information indicates that a mixed-color characteristic is to be corrected. Such an image processing method attains substantially the same advantages as the advantages attained by the image forming apparatuses described above.

The embodiments include a non-transitory, computer-readable storage medium storing computer-readable program code. For example, the program code causes a computer to function as an information providing unit that provides information indicating that a mixed-color characteristic is to be corrected, in response to satisfaction of a given condition. In other words, the program code causes a computer to perform an image processing method that includes providing information in response to satisfaction of a given condition. The information indicates that a mixed-color characteristic is to be corrected. Such a non-transitory, computer-readable storage medium attains substantially the same advantages as the advantages attained by the image forming apparatuses described above.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:

1. An image processing apparatus comprising:
an operation panel that includes a panel display; and
circuitry configured to
determine whether a condition is satisfied, the condition including whether the number of drive instructions received by at least one of a pressure roller or a heating roller exceeds a predetermined threshold number,
provide information in response to satisfaction of the condition, the information indicating that a mixed-color characteristic is to be corrected and being displayed as a message on the panel display prompting correction of the mixed-color characteristic, and
determine whether an instruction to correct the color mixed-color characteristic has been received in response to the message, wherein
in a case where the instruction to correct the mixed-color characteristic has not been received, the circuitry repeats the determination of whether the instruction has been received until it is determined that the instruction has been received.

2. The image processing apparatus according to claim 1, wherein
the condition further includes count information indicating at least one of a number of recording media bearing transferred toner images or a number of recording media bearing fixed toner images, and
the circuitry is further configured to provide the information in a case where at least one of the number of recording media bearing transferred toner images, the number of recording media bearing fixed toner images, or the number of drive instructions received by at least one of a pressure roller or a heating roller exceeds a threshold number.

3. The image processing apparatus according to claim 1, further comprising:
a transfer device configured to transfer a toner image onto a recording medium; and
a fixing device configured to fix the toner image onto the recording medium, wherein the condition further includes replacement information indicating a replacement of at least one of the transfer device or the fixing device, and the information is provided in a case where the replacement information indicates at least one of the transfer device or the fixing device has been replaced.

4. The image processing apparatus according to claim 3, wherein the transfer device includes an intermediate transfer belt, the fixing device includes a fixing belt, and the information is provided in a case where the replacement information indicates at least one of the intermediate transfer belt or the fixing belt has been replaced.

5. The image processing apparatus according to claim 1, further comprising:

a container configured to store a recording medium, wherein the condition further includes container information indicating addition of the recording medium to the container, and the information is provided in a case where the container information indicates the addition of the recording medium to the container.

6. The image processing apparatus according to claim 1, wherein the condition further includes recording medium change information indicating a change to a type of recording medium, and the information is provided in a case where the recording medium change information indicates the type of recording medium has been changed.

7. The image processing apparatus according to claim 1, further comprising:

an intermediate transferor, wherein the condition further includes primary transfer current change information indicating a change to an assigned value of a primary transfer current supplied to the intermediate transferor, the primary transfer current being supplied to transfer a toner image onto the intermediate transferor, and the information is provided in a case where the primary transfer current change information indicates the assigned value of the primary transfer current supplied to the intermediate transferor has been changed.

8. The image processing apparatus according to claim 1, wherein the condition further includes secondary transfer current change information indicating a change to an assigned value of a secondary transfer current that transfers a toner image onto a recording medium, and the information is provided in a case where the secondary transfer current change information indicates the assigned value of the secondary transfer current has been changed.

9. The image processing apparatus according to claim 1, further comprising:

a fixing device configured to fix a toner image onto a recording medium, wherein the condition further includes fixing temperature change information indicating a change to an assigned value of a fixing temperature at which the fixing device fixes the toner image onto the recording medium, and the information is provided in a case where the fixing temperature change information indicates the assigned value of the fixing temperature has been changed.

10. The image processing apparatus according to claim 1, wherein the circuitry is configured to terminate a process of providing the information upon determining that the condition is not satisfied.

11. An image processing method comprising:

determine whether a condition is satisfied, the condition including whether number of drive instructions received by at least one of a pressure roller or a heating roller exceeds a predetermined threshold number, providing information in response to satisfaction of the condition, the information indicating that a mixed-color characteristic is to be corrected;

displaying the provided information as a message on a panel display connected to a computer to prompt for correction of the mixed-color characteristic; and determining whether an instruction to correct the color mixed-color characteristic has been received in response to the message, wherein in a case where the instruction to correct the mixed-color characteristic has not been received, the circuitry repeats the determination of whether the instruction has been received until it is determined that the instruction has been received.

12. The image processing method according to claim 11, wherein the condition further includes count information indicating at least one of a number of recording media bearing transferred toner images or a number of recording media bearing fixed toner images, and the information is provided in a case where at least one of the number of recording media bearing transferred toner images, the number of recording media bearing fixed toner images, or the number of drive instructions received by at least one of a pressure roller or a heating roller exceeds a threshold number.

13. The image processing method according to claim 11, wherein the condition further includes replacement information indicating a replacement of at least one of a transfer device, device configured to transfer a toner image onto a recording medium, or a fixing device, configured to fix the toner image onto the recording medium, and the information is provided in a case where the replacement information indicates at least one of the transfer device or the fixing device has been replaced.

14. The image processing method according to claim 13, wherein the transfer device includes an intermediate transfer belt, the fixing device includes a fixing belt, and the information is provided in a case where the replacement information indicates at least one of the intermediate transfer belt or the fixing belt has been replaced.

15. The image processing method according to claim 11, wherein the condition further includes container information indicating addition of a recording medium to a container configured to store the recording medium, and the information is provided in a case there the container information indicates the addition of the recording medium to the container.

16. The image processing method according to claim 11, wherein the condition further includes recording medium change information indicating a change to a type of recording medium, and the information is provided in a case where the recording medium change information indicates the type of recording medium has been changed.

17. The image processing method according to claim 11, wherein the condition further includes primary transfer current change information indicating a change to an assigned value of a primary transfer current supplied to an intermediate transferor, the primary transfer current being supplied to transfer a toner image onto the intermediate transferor, and the information is provided in a case where the primary transfer current change information indicates the assigned value of the primary transfer current supplied to an intermediate transferor has been changed.

18. The image processing method according to claim 11, wherein the condition further includes secondary transfer current change information indicating a change to an assigned value of a secondary transfer current that transfers a toner image onto a recording medium, and the information is provided in a case where the secondary transfer current change information indicates the assigned value of the secondary transfer current has been changed.

19. A non-transitory, computer-readable storage medium storing computer-readable program code that causes a computer to perform an image processing method, the image processing method comprising:

determine whether a condition is satisfied, the condition including whether number of drive instructions received by at least one of a pressure roller or a heating roller exceeds a predetermined threshold number, providing information in response to satisfaction of the condition, the information indicating that a mixed-color characteristic is to be corrected;

displaying the provided information as a message on a panel display connected to the computer to prompt for correction of the mixed-color characteristic; and determining whether an instruction to correct the color mixed-color characteristic has been received in response to the message, wherein in a case where the instruction to correct the mixed-color characteristic has not been received, the circuitry repeats the determination of whether the instruction has been received until it is determined that the instruction has been received.

\* \* \* \* \*